US012090694B2

(12) United States Patent
Chen et al.

(10) Patent No.: US 12,090,694 B2
(45) Date of Patent: Sep. 17, 2024

(54) INJECTION MOLDING SYSTEM AND METHOD

(71) Applicant: KING STEEL MACHINERY CO., LTD., Taichung (TW)

(72) Inventors: Ching-Hao Chen, Taichung (TW); Liang-Hui Yeh, Taichung (TW)

(73) Assignee: KING STEEL MACHINERY CO., LTD., Taichung (TW)

( * ) Notice: Subject to any disclaimer, the term of this patent is extended or adjusted under 35 U.S.C. 154(b) by 0 days.

(21) Appl. No.: 17/812,722

(22) Filed: Jul. 15, 2022

(65) Prior Publication Data

US 2024/0017456 A1    Jan. 18, 2024

(51) Int. Cl.
*B29C 45/27*     (2006.01)
*B29C 45/22*     (2006.01)

(52) U.S. Cl.
CPC .......... *B29C 45/2701* (2013.01); *B29C 45/22* (2013.01); *B29C 2045/2791* (2013.01)

(58) Field of Classification Search
CPC ........................ B29C 2045/2791; B29C 45/22
See application file for complete search history.

(56) References Cited

U.S. PATENT DOCUMENTS

| | | |
|---|---|---|
| 2,499,565 A | 3/1950 | Booth |
| 3,723,040 A | 3/1973 | Rees |
| 5,948,450 A | 9/1999 | Swenson et al. |
| 2008/0089975 A1 | 4/2008 | Fairy |

FOREIGN PATENT DOCUMENTS

| | | | |
|---|---|---|---|
| CN | 2712602 Y | 7/2005 | |
| CN | 101342777 A | 1/2009 | |
| CN | 201728798 U | 2/2011 | |
| CN | 209176025 U | 7/2019 | |
| CN | 114080312 A | 2/2022 | |
| JP | S58-45037 A | 3/1983 | |
| JP | S63-281811 A | 11/1988 | |
| JP | H06-081716 | 11/1994 | |
| JP | 2001334552 A | 12/2001 | |
| JP | 2001341163 A | 12/2001 | |
| JP | 2002-292690 A | 10/2002 | |
| JP | 2002-355866 A | 12/2002 | |
| KR | 10-2010-0030931 | * 3/2010 | ............ B29C 45/20 |
| TW | 201716205 A | 5/2017 | |
| TW | 202000427 A | 1/2020 | |

(Continued)

OTHER PUBLICATIONS

Machine translation KR1020100030931 (Year: 2010).*

(Continued)

*Primary Examiner* — Matthew J Daniels
*Assistant Examiner* — Wayne K. Swier
(74) *Attorney, Agent, or Firm* — WPAT Law; Anthony King

(57) ABSTRACT

An injection molding system and method are disclosed. The injection molding system includes a molding device and injector. The molding device defines a mold cavity and includes an inlet portion in communication with the mold cavity. The injector includes a discharging channel. An end portion of the inlet portion and an end portion of the discharging channel have non-planar end surfaces respectively, which are engageable with each other.

20 Claims, 29 Drawing Sheets

(56) References Cited

FOREIGN PATENT DOCUMENTS

| TW | M607840 U | 2/2021 |
|----|-----------|--------|
| TW | 202138158 A | 10/2021 |
| TW | M639425 U | 4/2023 |
| WO | 2008/152872 A1 | 12/2008 |

OTHER PUBLICATIONS

Machine translation JPH0681716U (Year: 1994).*
Machine translation CN2712602Y (Year: 2005).*
Machine translation CN209176025U (Year: 2019).*
Machine translation CN114080312 (Year: 2022).*
Rejection Decision dated Jan. 5, 2023 issued by the Taiwan Intellectual Property Office (TIPO) for the Taiwanese application No. 110141653.
1st Office Action from the Japan Patent Office of JP patent application No. 2022-177336 dated Aug. 1, 2023.
English translation of 1st Office Action from the Japan Patent Office of JP patent application No. 2022-177336 dated Aug. 1, 2023.
3rd Office Action, Cited References and Search Report dated Nov. 21, 2023 issued by the Taiwan Intellectual Property Office for the TW patent application No. 111146044.
2nd Office Action, Cited References and Search Report dated Jan. 9, 2024 issued by the Japan Patent Office for the JP patent application No. 2022-177336.
English translation of 2nd Office Action dated Jan. 9, 2024 issued by the Japan Patent Office for the JP patent application No. 2022-177336.
1st Office Action from the Taiwan Intellectual Property Office of TW patent application No. 111146044 dated May 3, 2023.
Final Office Action from the Taiwan Intellectual Property Office of TW patent application No. 111146044 dated Jul. 13, 2023.
Search Report from the European Patent Office of EP patent application No. 22 210 178.4 dated Jul. 28, 2023.
Menrath Andreas-Foam Injection Molding (FIM) Oct. 20, 2017 (Oct. 20, 2017) pp. 1-2 XP93064530A.
English Abstract of JP-2001334552A, Published Dec. 4, 2001.
English Abstract of JP-2001341163A, Published Dec. 11, 2001.
4th Office Action, Cited References and Search Report dated Apr. 16, 2024 issued by the Taiwan Intellectual Property Office for the TW patent application No. 111146044.
3rd Office Action, Cited References and Search Report dated Jul. 9, 2024 issued by the Japan Patent Office for the JP patent application No. 2022-177336.

* cited by examiner

INJECTION MOLDING SYSTEM AND METHOD

TECHNICAL FIELD

The present invention is related to an injection molding system and an injection molding method, and, in particular, to an injection molding system and a method of injection molding for making a polymeric article.

BACKGROUND

Polymeric material has many advantages, such as high strength, low weight, impact resistance, thermal insulation, and others. Polymeric article can be made by injection molding or extrusion molding. For example, after the polymeric material is melted and mixed with a blowing agent to form a mixture, a force or pressure may be applied to the mixture to inject or extrude the mixture into a cavity of a mold, and the mixture may be foamed and cooled in the cavity to form the article.

In general, the appearance and physical properties of the polymer articles are directly affected by the forming process, and hence, the design of the mold must consider the fluidity of the mixture so that the mixture can be distributed in the cavity uniformly and rapidly. Although polymeric articles formed using the mold has many advantages and applications, their shortcomings are still the limitations and restrictions that have yet to be broken.

BRIEF SUMMARY OF THE INVENTION

According to one embodiment of the present disclosure, an injection molding system is disclosed. The injection molding system includes a molding device and injector. The molding device defines a mold cavity and includes an inlet portion in communication with the mold cavity. The injector includes a discharging channel. An end portion of the inlet portion and an end portion of the discharging channel have non-planar end surfaces respectively, which are engageable with each other.

According to one embodiment of the present disclosure, an injection molding system is disclosed. The injection molding system includes a molding device, an injector and a self-alignment mechanism. The molding device defines a mold cavity and a first passage in communication with the mold cavity. The injector defines an accommodation space and a second passage in communication with the accommodation space. The self-alignment mechanism is used for aligning an opening of the first passage of the molding device with an opening of the second passage of the injector.

According to one embodiment of the present disclosure, an injection molding method is disclosed. The injection molding method includes providing a molding device defining a mold cavity and including an inlet portion in communication with the mold cavity; providing an injector including a discharging channel; and engaging an end portion of the inlet portion with an end portion of the discharging channel, wherein an opening of a second passage defined by the discharging channel is self-aligned with an opening of a first passage defined by the inlet portion.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION

Figure 1:
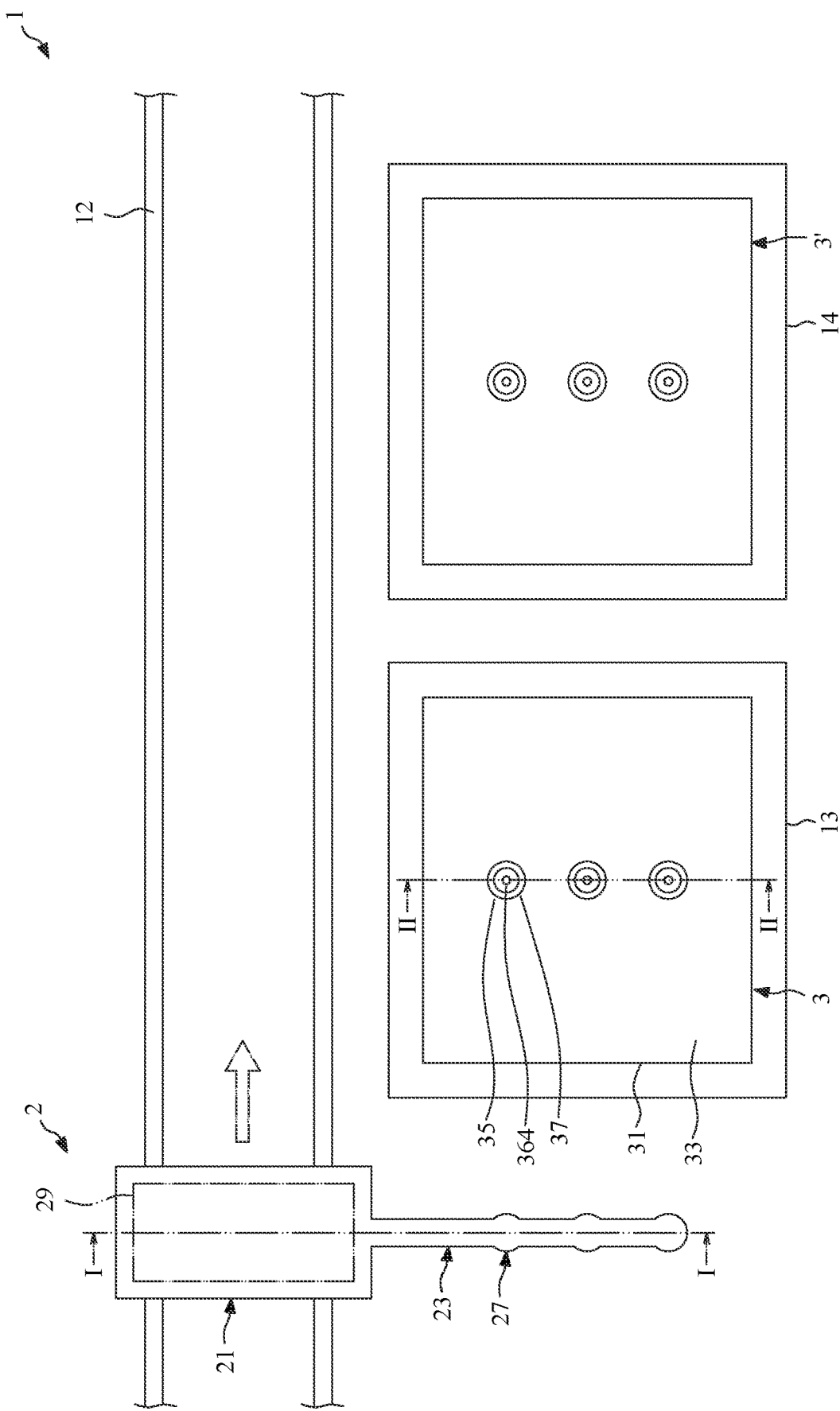
FIG. 1 is a schematic top view of an injection molding system according to one embodiment of the present invention.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages, such as those for quantities of materials, durations of times, temperatures, operating conditions, ratios of amounts, and the likes thereof disclosed herein, should be understood as modified in all instances by the term "about." Accordingly, unless indicated to the contrary, the numerical parameters set forth in the present disclosure and the attached claims are approximations that can vary as desired. At the very least, each numerical parameter should be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

FIG. 1 is a schematic top view of an injection molding system 1 according to one embodiment of the present invention. The injection molding system 1 may include at least one rail 12, at least one molding station 13, 14, at least one molding device 3, 3', an injector 2 and an extruding system 29.

The extruding system 29 and the injector 2 may be disposed on the rail 12, and may move or slide on the rail 12 or along the rail 12 toward the molding device 3, 3'. The extruding system 29 may be disposed on the injector 2, thus, the injector 2 may move or slide together with the extruding system 29. However, in some embodiments, the extruding system 29 may be disposed aside the injector 2 or the rail 12, and only the injector 2 may move or slide on the rail 12 or along the rail 12. The extruding system 29 may be configured to produce the mixture of a polymeric material and a blowing agent, and configured to inject the mixture into the injector 2. The extruding system 29 may be connected to or communicable with the injector 2. In some embodiments, the mixture may include a high molecular weight polymer and a blowing agent. In some embodiments, the blowing agent may be a physical or chemical additive that releases gas during the heating process, thereby forming pores in the thus-obtained foamed polymeric article. In some embodiments, the blowing agent may be a physical additive. In some embodiments, the blowing agent may be a supercritical fluid (SCF).

The injector 2 may include a main portion 21, an extending portion 23 and at least one discharging channel 27. The at least one molding station 13, 14 may be disposed aside the rail 12. The at least one molding device 3, 3' may be disposed on the at least one molding station 13, 14. The number of the molding station 13, 14 and the number of the molding device 3, 3' may be adjusted according to requirements. In some embodiments, the injection molding system 1 may include a plurality of molding stations 13, 14 and a plurality of molding devices 3, 3'. Each of the molding devices 3, 3' may be disposed on each of the molding stations 13, 14. Thus, the molding devices 3, 3' may be disposed side by side along the rail 12.

Figure 2:
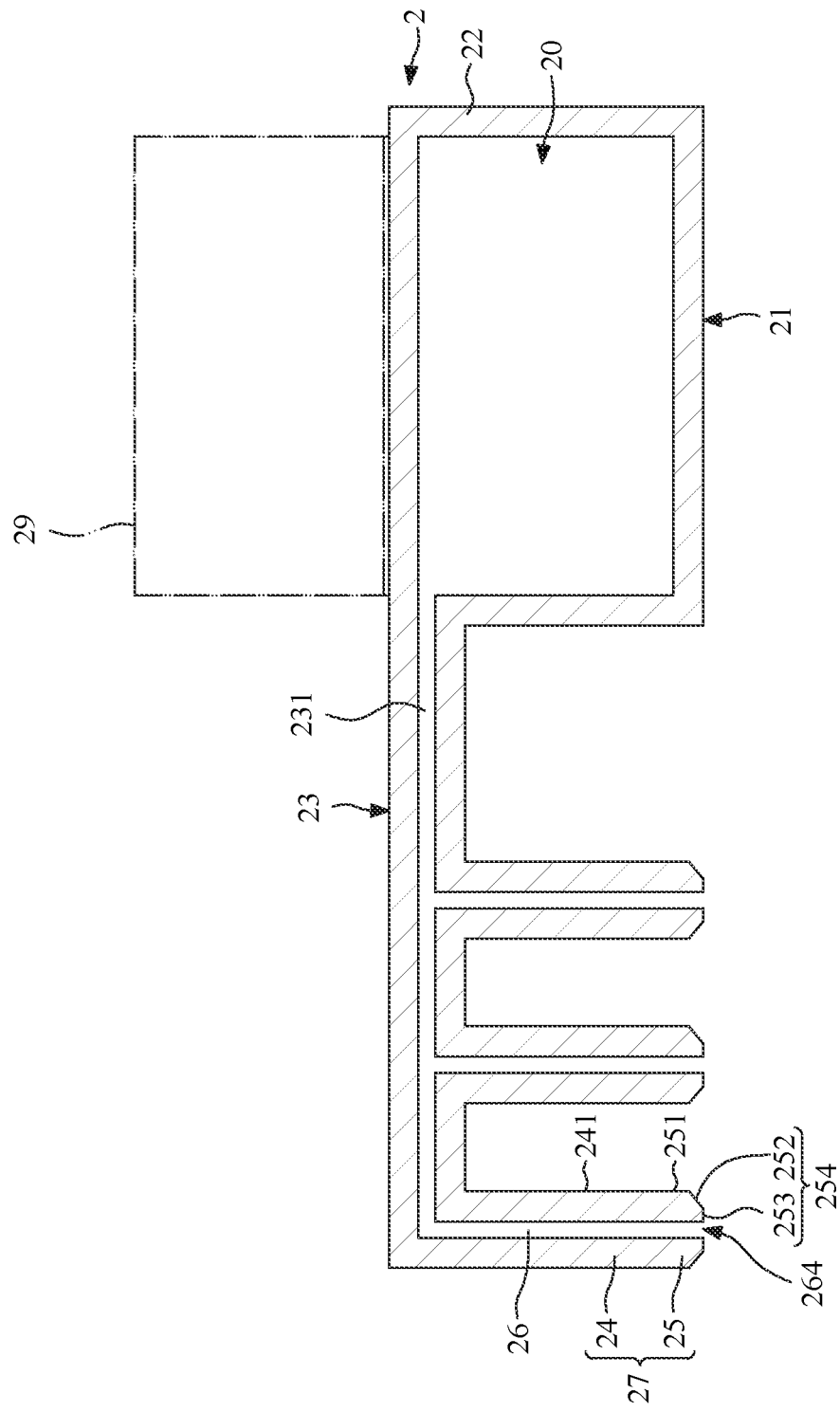
FIG. 2 is a schematic cross-sectional view illustrating the injector taken along line I-I of FIG. 1.

FIG. 2 is a schematic cross-sectional view illustrating the injector 2 taken along line I-I of FIG. 1. The injector 2 may include a main portion 21, an extending portion 23 and at least one discharging channel 27. The main portion 21 may define an accommodation space 20 by sidewall 22. The extending portion 23 may extend from the main portion 21. Alternatively, the extending portion 23 may be connected to the main portion 21. The extending portion 23 may define a connection passage 231 that is in communication with the accommodation space 20. The discharging channel 27 may extend from the extending portion 23. Alternatively, the discharging channel 27 may be connected to the extending portion 23. The discharging channel 27 may define a second passage 26 that is in communication with the connection passage 231 and the accommodation space 20. Thus, the discharging channel 27 may be a branch of the extending portion 23, and the second passage 26 may be in communication with the accommodation space 20 of the main portion 21.

The discharging channel 27 may include a main portion 24 and an end portion 25. In some embodiments, the main portion 24 and the end portion 25 may be formed integrally as a monolithic structure or one-piece structure. The main portion 24 has a lateral surface 241. The end portion 25 may have a lateral surface 251 and an end surface 254. The lateral surface 251 of the end portion 25 may be substantially coplanar with the lateral surface 241 of the main portion 24. The end surface 254 of the end portion 25 may include a first surface 252 and a second surface 253. The first surface 252 may be not coplanar with the second surface 253. The first surface 252 may intersect with the second surface 253 with an angle of greater than 90 degrees. Thus, the end surface 254 of the end portion 25 may be a non-planar surface. The end portion 25 of the discharging channel 27 may have a non-planar end surface 254. The entire end surface 254 of the end portion 25 may be not a flat surface. In addition, the first surface 252 may be not coplanar with the lateral surface 251. The first surface 252 may be a slanted surface that connects the lateral surface 251 and the second surface 253. Thus, the end portion 25 may taper toward the second surface 253. In some embodiments, an extension of the second surface 253 may be perpendicular to an extension of the lateral surface 251.

As shown in FIG. 2, the second passage 26 may extend through the main portion 24 and the end portion 25, and may have an opening 264 at the second surface 253. The opening 264 may be an outlet port. In some embodiments, the mixture in the extruding system 29 may be injected to the second passage 26 of the discharging channel 27 from the accommodation space 20 through the connection passage 231. In some embodiments, one discharging channel 27 may correspond to one extending portion 23. In some embodiments, one extending portion 23 may correspond to several discharging channels 27. In some embodiments, a plurality of discharging channels 27 may be connected to or communicable with the extending portion 23. In some embodiments, each of the discharging channels 27 may be attached to the extending portion 23. The number of the discharging channels 27 may be adjusted according to the property of the mixture.

The discharging channels 27 may be extended parallel to each other and arranged adjacent to each other. In some embodiments, each discharging channel 27 may accommodate different amounts of the mixture injected from the accommodation space 20. The discharging channels 27 may discharge the same or different amount of the mixture into the molding device 3. In some embodiments, each discharging channel 27 may operate under different temperatures. In some embodiments, the discharging channels 27 may have different widths or diameters, and thus may have different flow rates of the mixture. In some embodiments, the end portions 25 of the discharging channels 27 may inject different amounts of the mixture.

Referring to FIG. 1, the number of the molding devices 3, 3' may be adjusted according to requirements. In some embodiments, a plurality of molding devices 3, 3' may correspond to one injector 2. The mixture can be flowed from the extruding system 29 into one molding device 3, 3' through the discharging channel 27 of the injector 2. FIG. 1 illustrates only two molding devices 3, 3' for clarity and simplicity, but such example is intended to be illustrative only, and is not intended to be limiting to the embodiments. A person ordinarily skilled in the art would readily understand that any suitable number of the molding devices 3, 3' may be utilized, and all such combinations are fully intended to be included within the scope of the embodiments. Additionally, the molding devices 3, 3' are illustrated as having similar features, this is intended to be illustrative and is not intended to limit the embodiments, as the molding devices 3, 3' may have similar structures or different structures in order to meet the desired functional capabilities.

Figure 3:
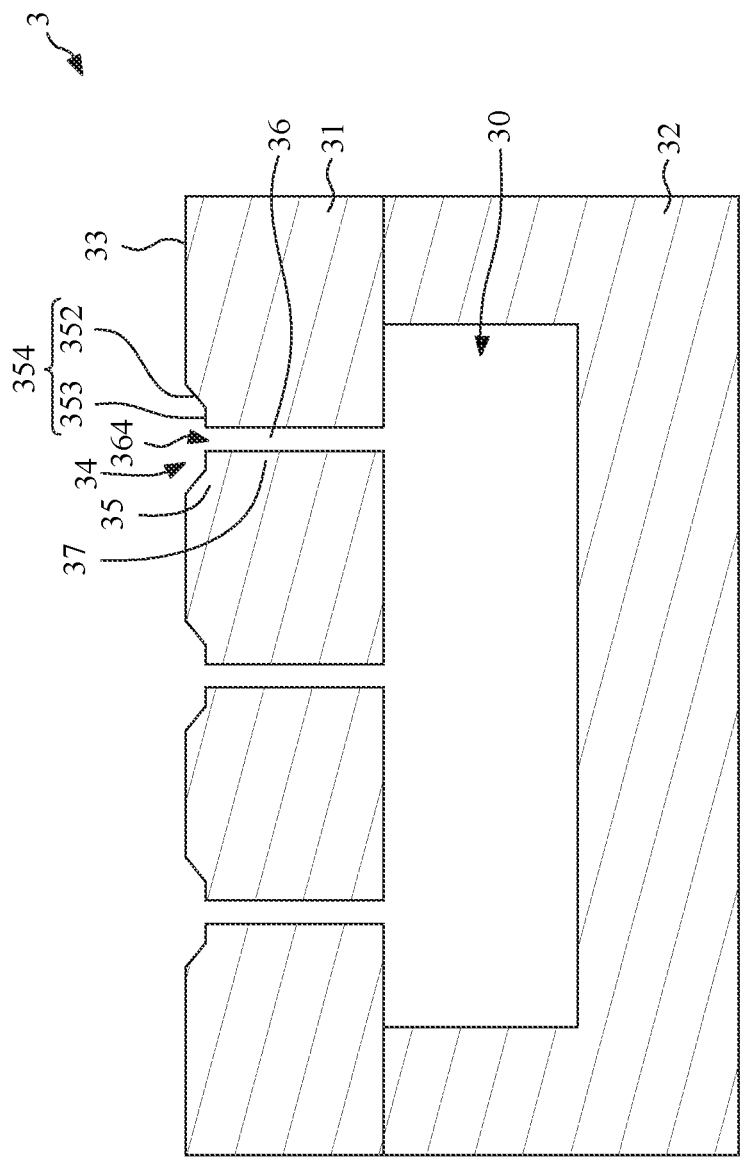
FIG. 3 is a schematic cross-sectional view illustrating the molding device taken along line II-II of FIG. 1.

FIG. 3 is a schematic cross-sectional view illustrating the molding device 3 taken along line II-II of FIG. 1. The molding device 3 may have a top surface 33, and may include an upper mold 31 and a lower mold 32 opposite to the upper mold 31. The molding device 3 (including the upper mold 31 and the lower mold 32) may define a mold cavity 30 and a first passage 36 in communication with the mold cavity 30. FIG. 3 illustrates one molding device 3 includes one mold cavity 30 for clarity and simplicity, but such example is intended to be illustrative only, and is not intended to be limiting to the embodiments. A person ordinarily skilled in the art would readily understand that one molding device 3 may include several mold cavities 30.

In some embodiments, the mold cavity 30 is defined by the upper mold 31 and the lower mold 32. In some embodiments, the upper mold 31 and the lower mold 32 are complementary with and separable from each other. In some embodiments, the lower mold 32 may define the mold cavity 30, and the upper mold 31 may have a consistent thickness and cover the lower mold 32 and the mold cavity 30. However, in other embodiments, the lower mold 32 may define a lower mold cavity, and the upper mold 31 may define an upper mold cavity opposite to the lower mold cavity. The mold cavity 30 may be formed by the upper mold cavity and the lower mold cavity.

The upper mold 31 of the molding device 3 may include an inlet portion 37. In some embodiments, the upper mold 31 and the inlet portion 37 may be formed integrally as a monolithic structure or one-piece structure. The first passage 36 may extend through the inlet portion 37. Thus, the inlet portion 37 may be in communication with the mold cavity 30. The inlet portion 37 may include an end portion 35. The end portion 35 may define a recessed portion 34 recessed from the top surface 33 of the molding device 3. The end portion 35 of the inlet portion 37 may have an end surface 354. The end surface 354 of the end portion 35 may include a first surface 352 and a second surface 353. The first surface 352 may be not coplanar with the second surface 353. The first surface 352 may intersect with the second surface 353 with an angle of greater than 90 degrees. Thus, the end surface 354 of the end portion 35 may be a non-planar surface. The end portion 35 of the inlet portion 37 may have a non-planar end surface 354. The entire end surface 354 of the end portion 35 may be not a flat surface. The entire end surface 354 of the end portion 35 of the inlet portion 37 may be non-coplanar with the top surface 33 of the molding device 3. In some embodiments, the end surface 354 (including the first surface 352 and the second surface 353) of the end portion 35 of the inlet portion 37 is recessed from the top surface 33 of the molding device 3 so as to define the recessed portion 34.

In addition, the first surface 352 may be a slanted surface that connects the top surface 33 of the molding device 3 and the second surface 353. Thus, the recessed portion 34 may taper away from the top surface 33 of the molding device 3. In some embodiments, the first passage 36 may be in communication with the recessed portion 34, and the recessed portion 34 may taper toward the first passage 36. The first passage 36 may have an opening 364 at the second surface 353. The opening 364 may be an inlet port or a feeding port. FIG. 3 illustrates three inlet portions 37 are included in one molding device 3 for clarity and simplicity, but such example is intended to be illustrative only, and is not intended to be limiting to the embodiments. A person ordinarily skilled in the art would readily understand that one molding device 3 may include one or more inlet portions 37 communicable with one mold cavity 30.

Figure 4:
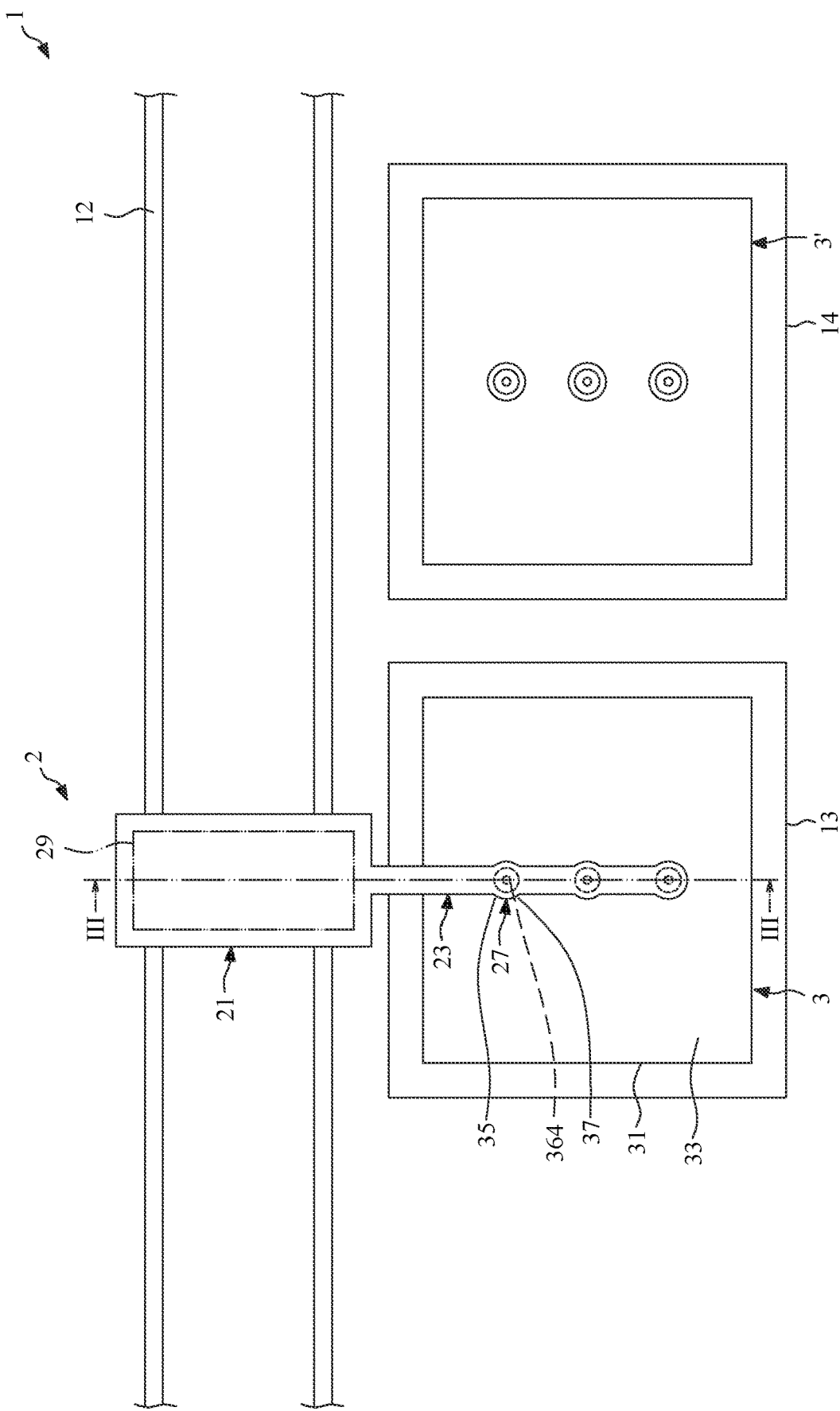
FIG. 4 is a schematic top view of the injection molding system of FIG. 1, wherein the injector moves horizontally to a location corresponding to the molding device.
Figure 5:
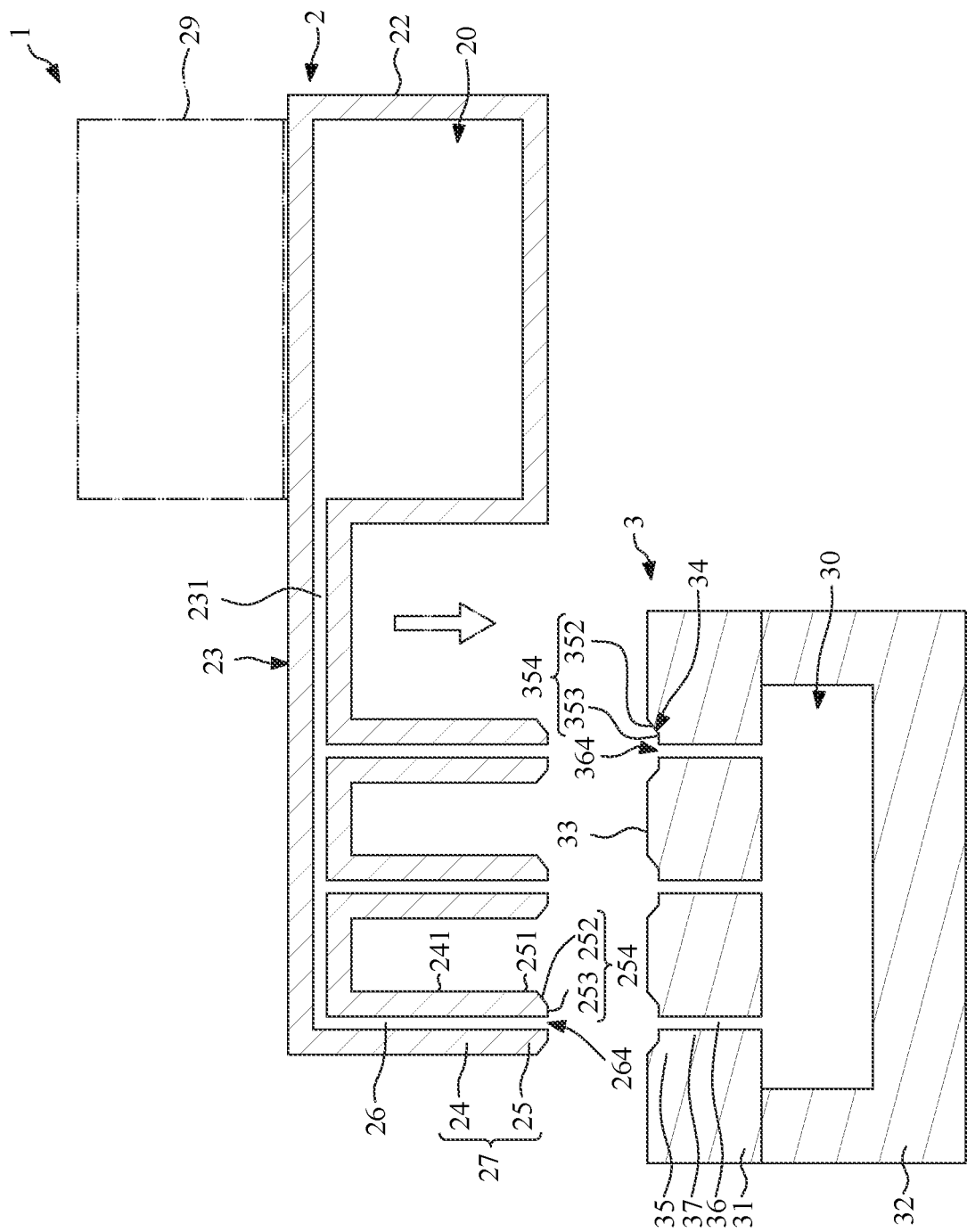
FIG. 5 is a schematic cross-sectional view illustrating the injector and the molding device taken along line of FIG. 4.

FIG. 4 is a schematic top view of the injection molding system 1 of FIG. 1, wherein the injector 2 moves horizontally to a location corresponding to the molding device 3. FIG. 5 is a schematic cross-sectional view illustrating the injector 2 and the molding device 3 taken along line III-III of FIG. 4. As shown in FIG. 5, the discharging channels 27 may be disposed above the inlet portions 37 of the molding device 3. In some embodiments, the second passage 26 or the opening 264 of the discharging channel 27 may be aligned with the first passage 36 or the opening 364 of the inlet portion 37 of the molding device 3. A central axis of the second passage 26 of the discharging channel 27 may be aligned with a central axis of the first passage 36 of the inlet portion 37 of the molding device 3.

The end portion 25 of the discharging channel 27 may be configured to dock the end portion 35 of the inlet portion 37 of the molding device 3. In some embodiments, the end portion 25 of the discharging channel 27 and the end portion 35 of the inlet portion 37 of the molding device 3 may be engageable with each other. For example, the end surface 354 of the end portion 35 of the inlet portion 37 of the molding device 3 and the end surface 254 of the end portion 25 of the discharging channel 27 may be complementary with each other. That is, a profile of the end portion 25 of the discharging channel 27 may match a profile of the recessed portion 34 of the inlet portion 37 of the molding device 3.

Figure 5A:
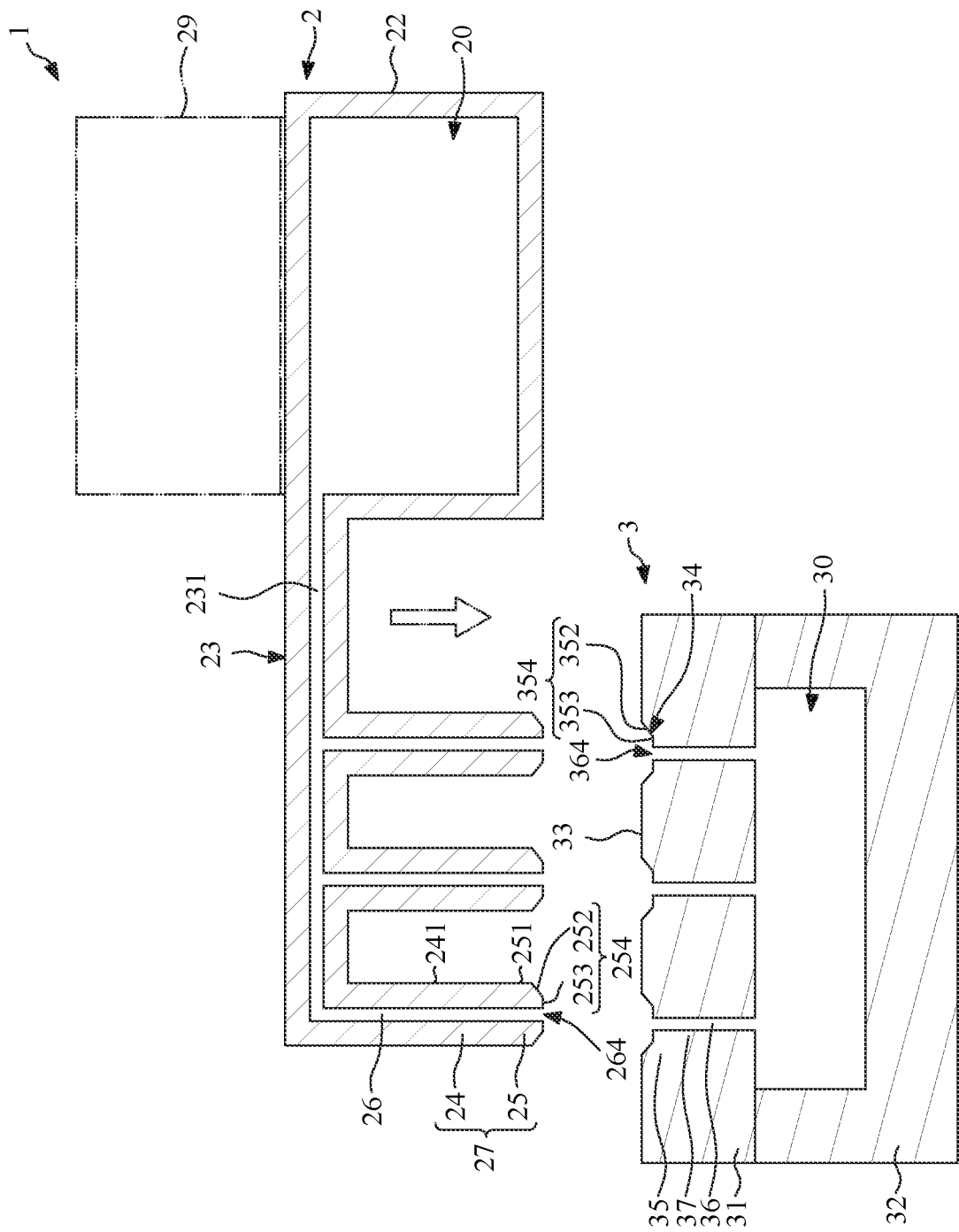
FIG. 5A is a schematic cross-sectional view of the injection molding system, wherein the injector moves horizontally to a location corresponding to the molding device.

FIG. 5A is a schematic cross-sectional view of the injection molding system 1, wherein the injector 2 moves horizontally to a location corresponding to the molding device 3. As shown in FIG. 5A, the discharging channels 27 may be disposed above the inlet portions 37 of the molding device 3. In some embodiments, the second passage 26 or the opening 264 of the discharging channel 27 may be slightly misaligned with the first passage 36 or the opening 364 of the inlet portion 37 of the molding device 3. There may be a small shift between the central axis of the second passage 26 of the discharging channel 27 and the central axis of the first passage 36 of the inlet portion 37 of the molding device 3.

Figure 6:
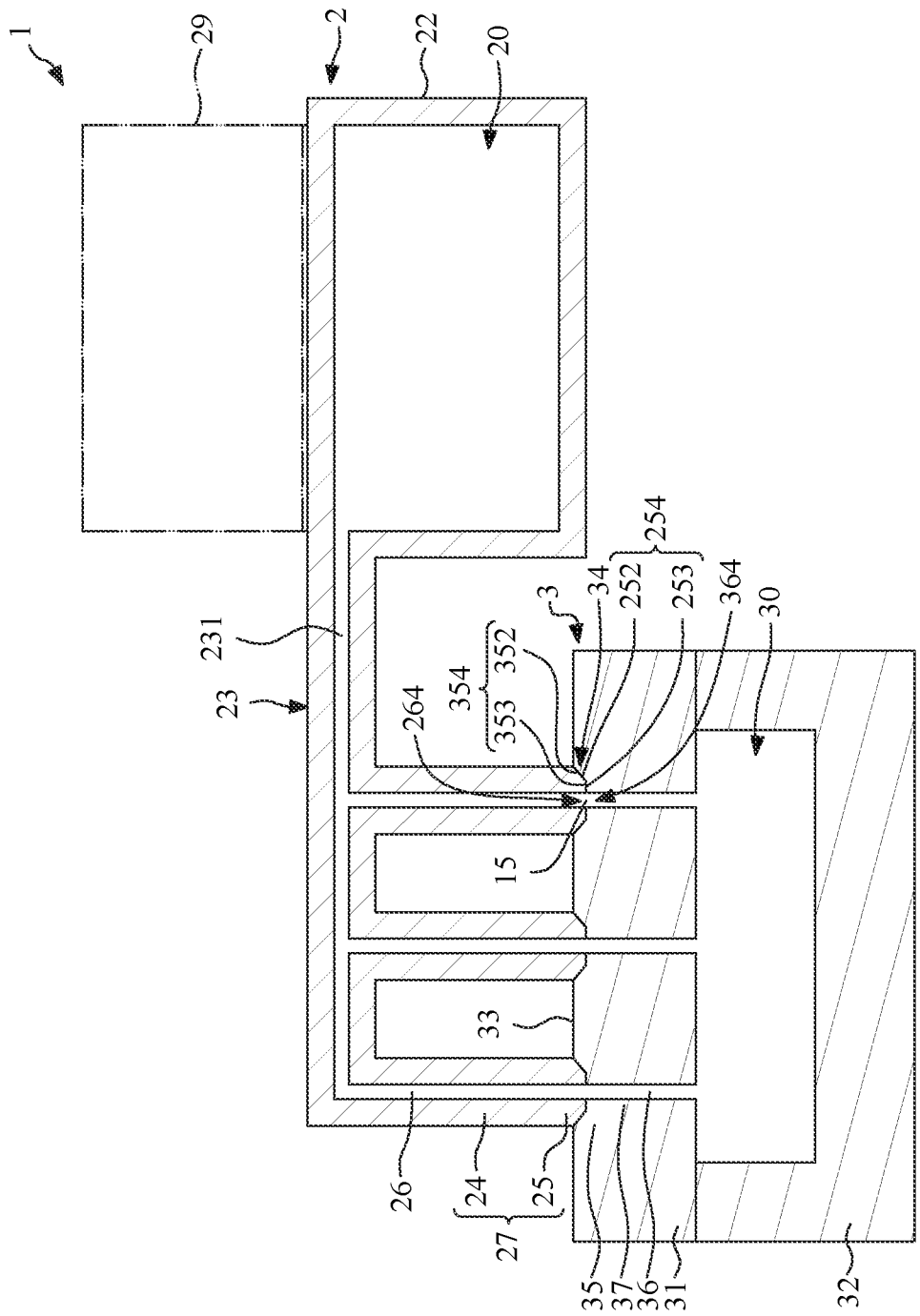
FIG. 6 is a schematic cross-sectional view of the injection molding system, wherein the injector moves downward to contact the molding device.

FIG. 6 is a schematic cross-sectional view of the injection molding system 1, wherein the injector 2 moves downward to contact the molding device 3. As shown in FIG. 6, the injector 2 of FIG. 5 or FIG. 5A may move downward to contact the molding device 3. Since the end surface 354 of the end portion 35 of the inlet portion 37 of the molding device 3 and the end surface 254 of the end portion 25 of the discharging channel 27 may be complementary with each other, the end portion 35 of the inlet portion 37 of the molding device 3 and the end portion 25 of the discharging channel 27 may engage with each other. In some embodiments, the discharging channel 27 may be received by the inlet portion 37 of the molding device 3. Thus, the end portion 25 of the discharging channel 27 may be configured to dispose within the recessed portion 34 of the molding device 3. The end portion 25 of the discharging channel 27 may fill the recessed portion 34 of the molding device 3. Thus, the end portion 25 of the discharging channel 27 may be at least partially surrounded by the end portion 35 of the inlet portion 37 of the molding device 3. The end portions 25 of the discharging channels 27 may be docked to the end portions 35 of the inlet portions 37 of the molding device 3 respectively. The mixture can be transported from the discharging channel 27 into the mold cavity 30 of the molding device 3. In some embodiments, the mixture is injected into the mold cavity 30 and then a foamed polymeric article is formed in the mold cavity 30 after a period of time.

The first passage 36 or the opening 364 of the molding device 3 may be communicable with the second passage 26 or the opening 264 of the injector 2 at a connecting point 15. The connecting point 15 may be not leveled with the top surface 33 of the molding device 3. In some embodiments, an elevation of the connecting point 15 may be lower than an elevation of the top surface 33 of the molding device 3.

The end surface 354 of the end portion 35 of the inlet portion 37 of the molding device 3 may contact the end surface 254 of the end portion 25 of the discharging channel 27 at an interface. For example, the interface may be the end surface 354 of the end portion 35 of the inlet portion 37 of the molding device 3 or the end surface 254 of the end portion 25 of the discharging channel 27. The interface may be non-coplanar with the top surface 33 of the molding device 3. In some embodiments, the interface may be recessed from the top surface 33 of the molding device 3.

In some embodiments, the molding device 3 may further define a junction point (not shown) in communication within the mold cavity 30. The junction point may be configured to allow a fluid or gas to enter into or exit from the mold cavity 30. A gas conduit (not shown) of a gas source (not shown) may be coupled to the junction point. In some embodiments, the gas source may be configured to supply a fluid or gas, in which a suitable fluid or gas may be supplied depending on the needs; for example, the fluid or gas may be air, inert gas, etc., but the present invention is not limited thereto. The location, shape and number of the junction point are not particularly limited, and may be adjusted depending on the needs. In some embodiments, the junction point is a hole. In some embodiments, the junction point is disposed at the inner sidewall or the inner bottom wall of the lower mold 32 and penetrates the lower mold 32. In some embodiments, the junction point is configured to supply gas and discharge gas.

The molding device 3 may further include a pressure-sensing unit (not shown) configured to sense the pressure in the mold cavity 30. In some embodiments, the properties of foamed polymers are affected by the pore size and distribution across the polymer, whereas the pore size and distribution are related to the temperature, pressure, and feeding rate. The pressure-sensing unit is not limited to any particular type, as long as it can sense the pressure and provide pressure information after sensing the pressure in the mold cavity 30. When the gas exits from/enters into the mold cavity 30, the pressure in the mold cavity 30 must be adjusted so that the foamed polymeric article thus obtained may have the desired predetermined shape and property.

In the present disclosure, before the mixture is injected into the mold cavity 30, there is a pressure (e.g., greater than 1 atm) supplied in the mold cavity 30 by the gas source. Thus, the leak-tightness between the injector 2 and the molding device 3 is a critical issue. In the embodiment illustrated in FIG. 1 to FIG. 6, since the end surface 354 of the end portion 35 of the inlet portion 37 of the molding device 3 and the end surface 254 of the end portion 25 of the discharging channel 27 may be complementary with each other, the end portion 35 of the inlet portion 37 of the molding device 3 and the end portion 25 of the discharging channel 27 may engage tightly with each other. Thereby, forming an excellent leak-tightness between the injector 2 and the molding device 3. Therefore, the air leakage or undesired lowered pressure can be improved.

In addition, as shown in FIG. 5A, the second passage 26 or the opening 264 of the discharging channel 27 may be slightly misaligned with the first passage 36 or the opening 364 of the inlet portion 37 of the molding device 3. In the embodiment illustrated in FIG. 1 to FIG. 6, due to the design of the first surface 352 of the end portion 35 of the inlet portion 37 of the molding device 3 and the first surface 252 of the end portion 25 of the discharging channel 27, the discharging channel 27 may be guided to a desired position during the downward movement of the injector 2, which may be a self-aligned effect. That is, the injection molding system 1 may include a self-alignment mechanism for aligning the opening 364 of the first passage 36 of the molding device 3 with the opening 264 of the second passage 26 of the injector 2. The self-alignment mechanism may include the recessed portion 34 of the molding device 3 and the end portion 25 of the discharging channel 27. As a result, the first passage 36 or the opening 364 of the molding device 3 may be aligned with the second passage 26 or the opening 264 of the injector 2, as shown in FIG. 6. That is, the match of the first surface 352 of the end portion 35 of the inlet portion 37 of the molding device 3 and the first surface 252 of the end portion 25 of the discharging channel 27 can cure the position tolerance between the injector 2 and the molding device 3. Thus, the mixture can be injected from the second passage 26 of the discharging channel 27 to the first passage 36 of the molding device 3 smoothly without leaking out.

Figure 6A:
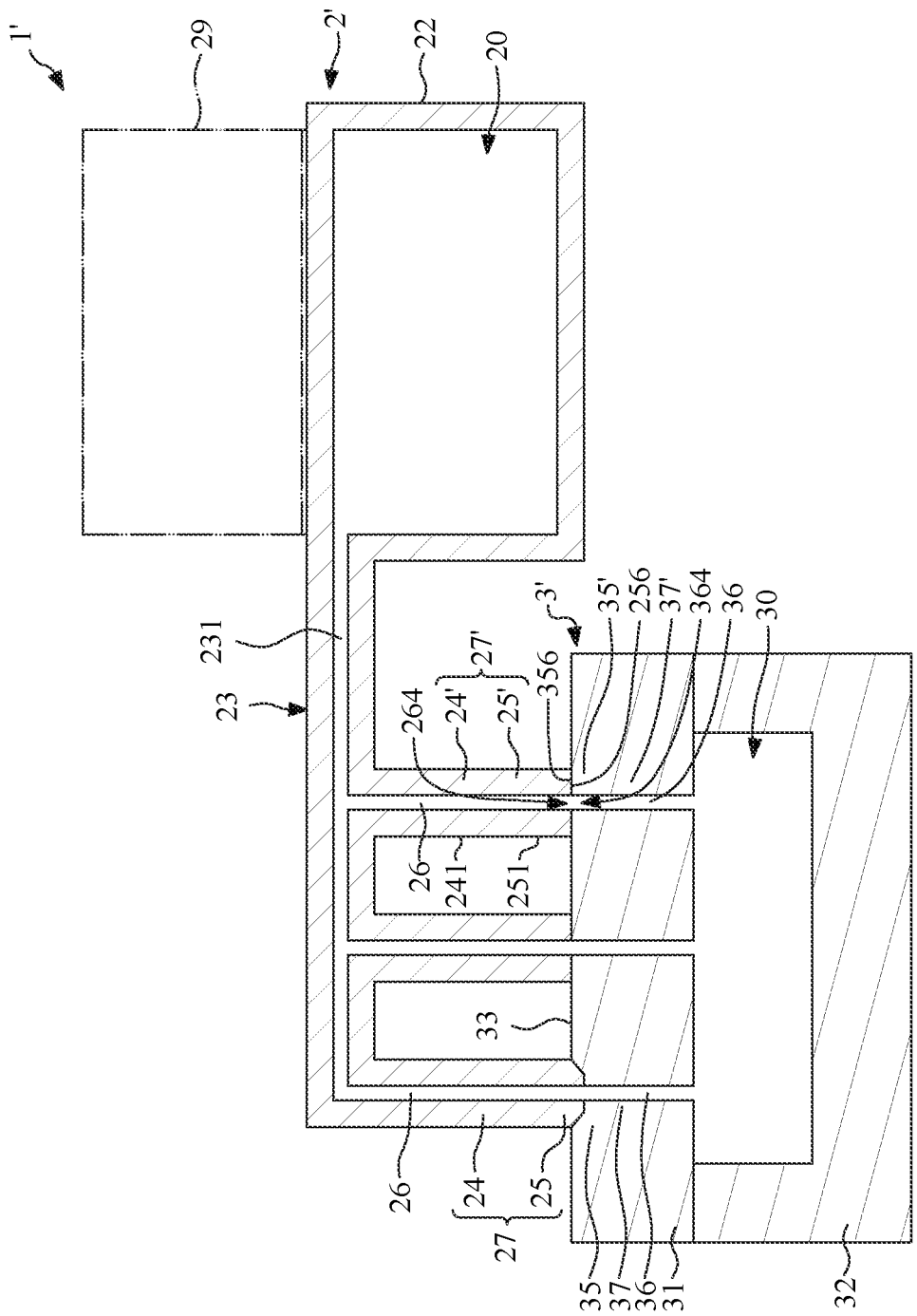
FIG. 6A is a schematic cross-sectional view of an injection molding system according to one embodiment of the present invention.

FIG. 6A is a schematic cross-sectional view of an injection molding system 1' according to one embodiment of the present invention. The injection molding system of FIG. 6A may be similar to the injection molding system 1 of FIG. 6, except that the discharging channels of the injection molding system 1' may have different structures, and the inlet portions of the injection molding system 1' may have different structures. As shown in FIG. 6A, at least one of the discharging channels (e.g., the discharging channel 27') may be different from the discharging channel 27. The discharging channel 27' of the injector 2' may include a main portion 24' and an end portion 25'. The end portion 25' of the discharging channel 27' of the injector 2' may have a flat end surface 256 perpendicular to the lateral surface 241 and/or the lateral surface 251. In addition, at least one of the inlet portions (e.g., the inlet portion 37') of the molding device 3' may be different from the inlet portion 37. The inlet portion 37' of the molding device 3' may include an end portion 35'. The end portion 35' of the inlet portion 37' of the molding device 3' may have a flat end surface 356 coplanar with the top surface 33 of the molding device 3'. When the end portion 35 of the inlet portion 37 of the molding device 3' is engaged with the end portion 25 of the discharging channel 27 of the injector 2', the flat end surface 256 of the end portion 25' of the discharging channel 27' may contact the flat end surface 356 of the end portion 35' of the inlet portion 37' tightly, and the second passage 26 or the opening 264 of the discharging channel 27' may be aligned with the first passage 36 or the opening 364 of the inlet portion 37' of the molding device 3'.

Figure 7:
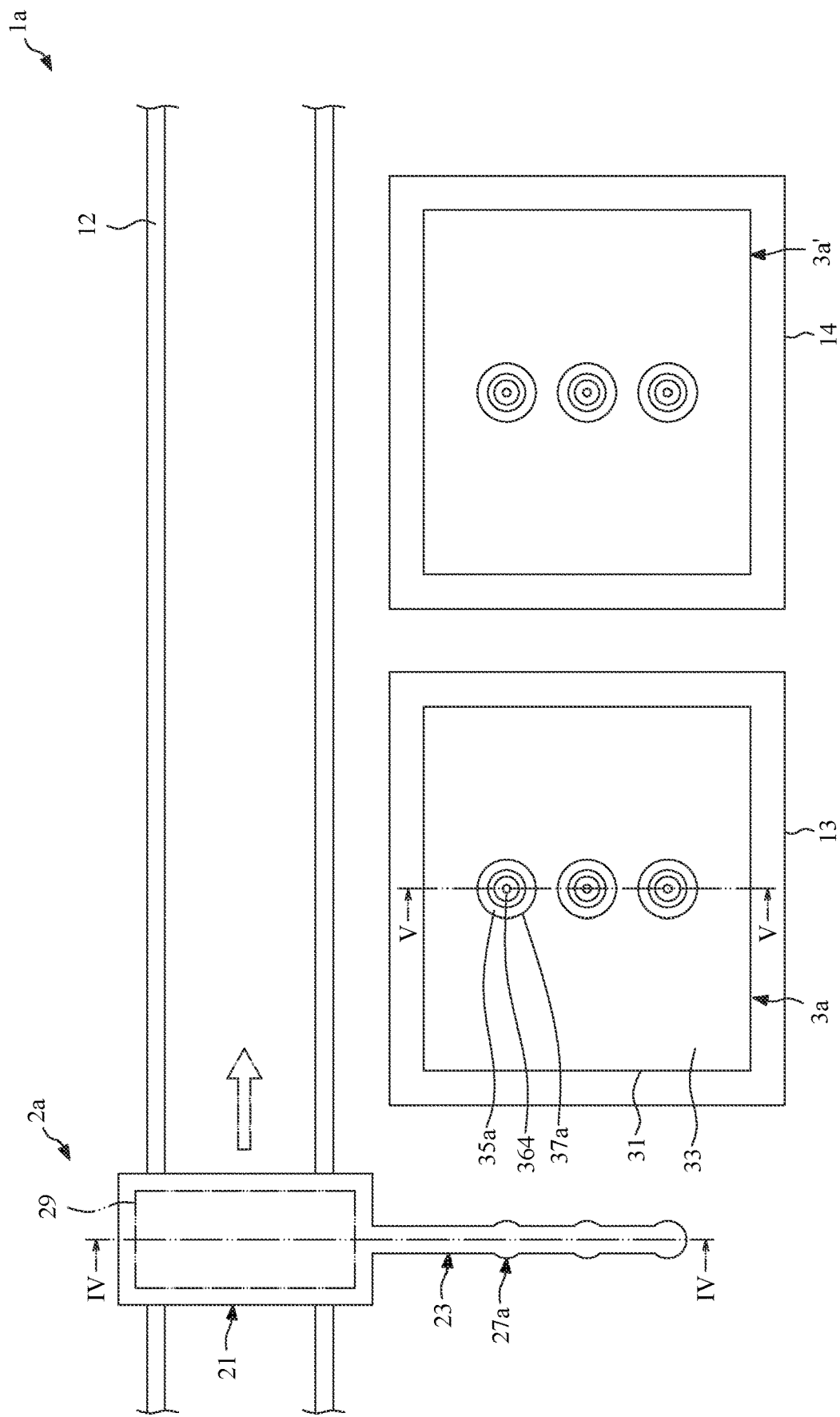
FIG. 7 is a schematic top view of an injection molding system according to one embodiment of the present invention.

FIG. 7 is a schematic top view of an injection molding system 1a according to one embodiment of the present invention. The injection molding system 1a may include at least one rail 12, at least one molding station 13, 14, at least one molding device 3a, 3a', an injector 2a and an extruding system 29. The rail 12, the molding station 13, 14 and the extruding system 29 of FIG. 7 may be same as the rail 12, the molding station 13, 14 and the extruding system 29 of FIG. 1, respectively. The molding device 3a of FIG. 7 may be similar to the molding device 3 of FIG. 1, except for a structure of the inlet portion 37a. The injector 2a of FIG. 7 may be similar to the injector 2 of FIG. 1, except for a structure of the discharging channel 27a.

Figure 8:
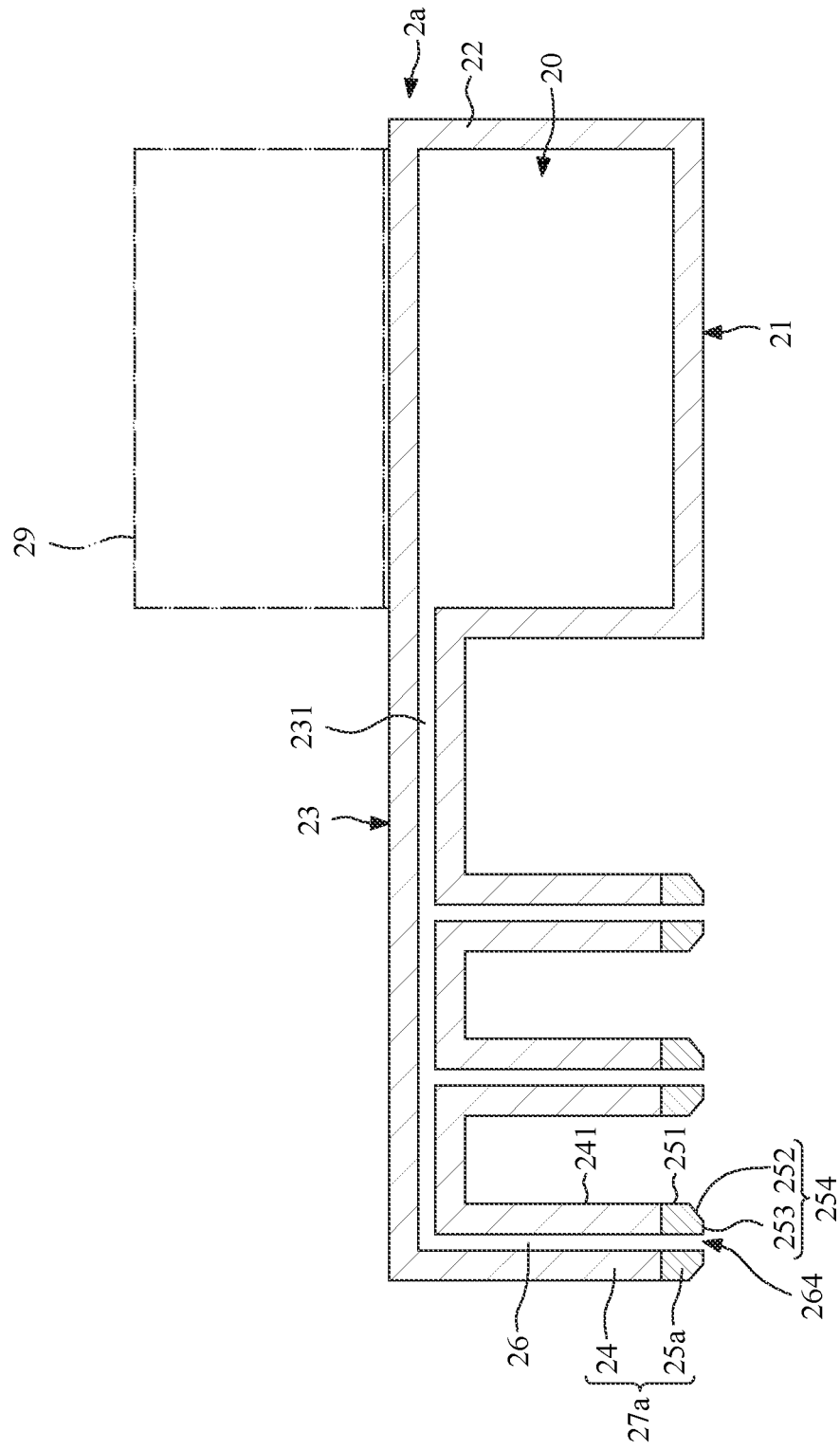
FIG. 8 is a schematic cross-sectional view illustrating the injector taken along line IV-IV of FIG. 7.

FIG. 8 is a schematic cross-sectional view illustrating the injector 2a taken along line IV-IV of FIG. 7. The injector 2a may include a main portion 21, an extending portion 23 and at least one discharging channel 27a. The main portion 21 and the extending portion 23 of FIG. 8 may be same as or similar to the main portion 21 and the extending portion 23 of FIG. 2, respectively. The discharging channel 27a may include a main portion 24 and an end portion 25a. In some embodiments, the main portion 24 and the end portion 25a may be different elements. Thus, the end portion 25a may be detachably attached to the main portion 24. Alternatively, the end portion 25a may be disposed on the main portion 24. In some embodiments, the end portion 25a may be a discharge outlet or an injection nozzle. The structure and profile of the end portion 25a of FIG. 8 may be same as or similar to the structure and profile of the end portion 25 of FIG. 2. The end surface 254 of the end portion 25a may include a first surface 252 and a second surface 253. The first surface 252 may be not coplanar with the second surface 253. Thus, the end surface 254 of the end portion 25a may be a non-planar surface. The second passage 26 may extend through the main portion 24 and the end portion 25a, and may have an opening 264 at the second surface 253.

Figure 9:
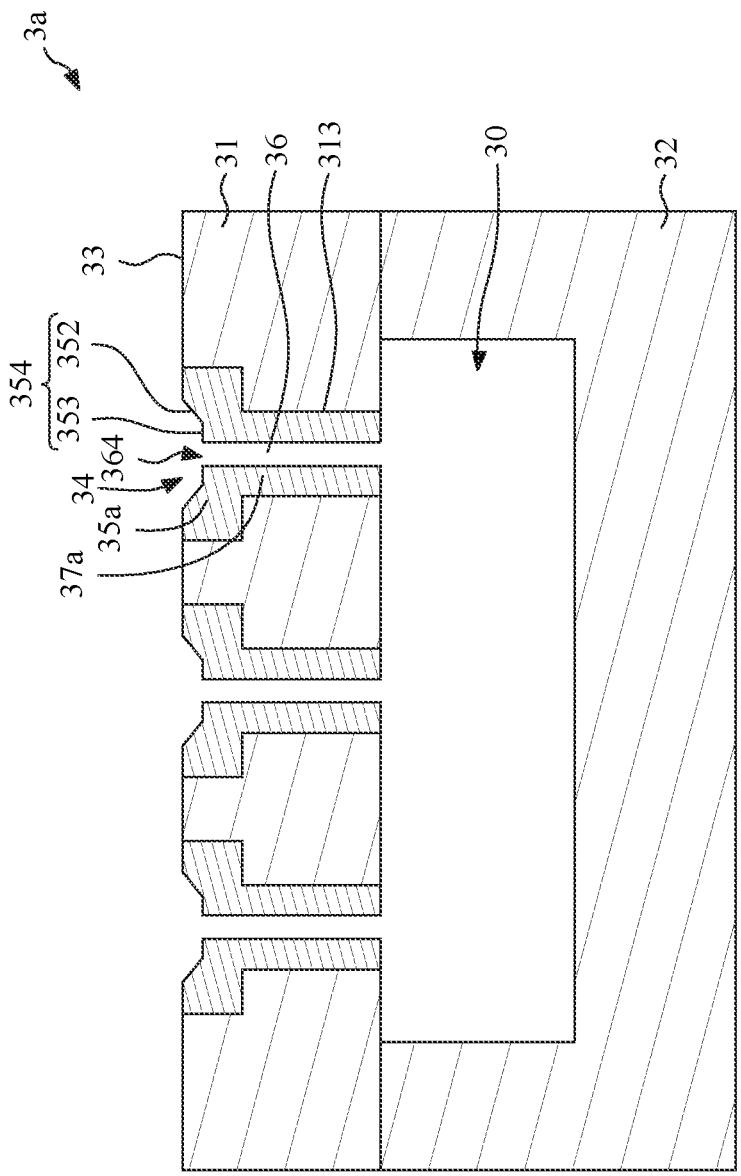
FIG. 9 is a schematic cross-sectional view illustrating the molding device taken along line V-V of FIG. 7.

FIG. 9 is a schematic cross-sectional view illustrating the molding device 3a taken along line V-V of FIG. 7. The molding device 3a may have a top surface 33, and may include an upper mold 31 and a lower mold 32 opposite to the upper mold 31. The molding device 3a (including the upper mold 31 and the lower mold 32) may define a mold cavity 30 and a first passage 36 in communication with the mold cavity 30. The molding device 3a may further include an inlet portion 37a embedded in or disposed in an through hole 313 of the upper mold 31. Thus, the upper mold 31 and the inlet portion 37a may be different elements. The inlet portion 37a may be a sprue bushing, and may be detachable from the upper mold 31. The first passage 36 may extend through the inlet portion 37a. The inlet portion 37a may include an end portion 35a. The end portion 35a may define a recessed portion 34 recessed from the top surface 33 of the molding device 3a. The end portion 35a of the inlet portion 37a may have an end surface 354. The end surface 354 of the end portion 35a may include a first surface 352 and a second surface 353. The first surface 352 may be not coplanar with the second surface 353. Thus, the end surface 354 of the end portion 35a may be a non-planar surface.

The entire end surface 354 of the end portion 35a of the inlet portion 37a may be non-coplanar with the top surface 33 of the molding device 3a. In some embodiments, the first passage 36 may be in communication with the recessed portion 34, and the recessed portion 34 may taper toward the first passage 36. The first passage 36 may have an opening 364 at the second surface 353.

Figure 10:
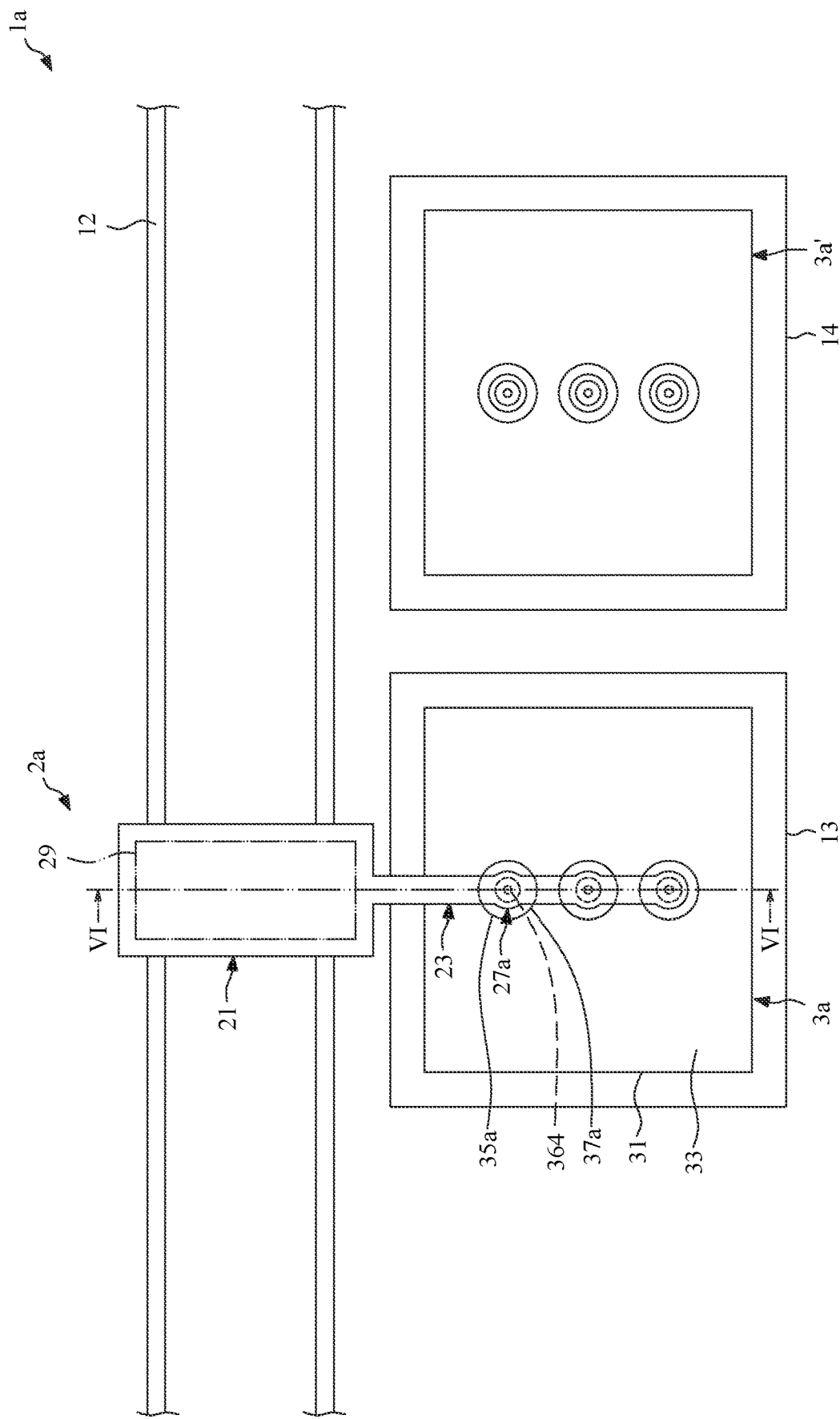
FIG. 10 is a schematic top view of the injection molding system of FIG. 7, wherein the injector moves horizontally to a location corresponding to the molding device.
Figure 11:
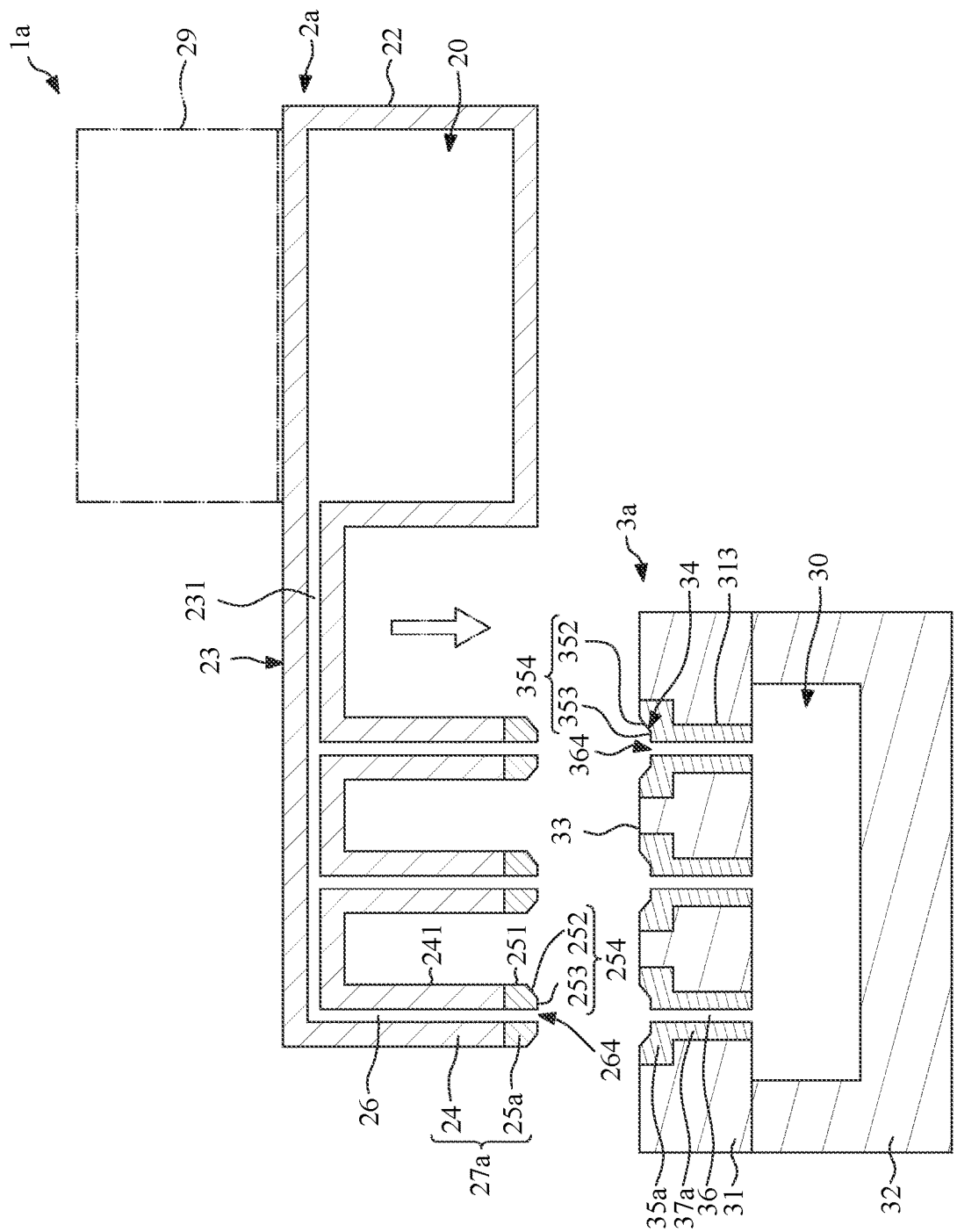
FIG. 11 is a schematic cross-sectional view illustrating the injector and the molding device taken along line VI-VI of FIG. 10.

FIG. 10 is a schematic top view of the injection molding system 1a of FIG. 7, wherein the injector 2a moves horizontally to a location corresponding to the molding device 3a. FIG. 11 is a schematic cross-sectional view illustrating the injector 2a and the molding device 3a taken along line VI-VI of FIG. 10, As shown in FIG. 11, the discharging channels 27a may be disposed above the inlet portions 37a of the molding device 3a. In some embodiments, the second passage 26 or the opening 264 of the discharging channel 27a may be aligned with the first passage 36 or the opening 364 of the inlet portion 37a of the molding device 3a. A central axis of the second passage 26 of the discharging channel 27a may be aligned with a central axis of the first passage 36 of the inlet portion 37a of the molding device 3a. In some embodiments, the end portion 25a of the discharging channel 27a and the end portion 35a of the inlet portion 37a of the molding device 3a may be engageable with each other. For example, the end surface 354 of the end portion 35a of the inlet portion 37a of the molding device 3a and the end surface 254 of the end portion 25a of the discharging channel 27a may be complementary with each other. That is, a profile of the end portion 25a of the discharging channel 27a may match a profile of the recessed portion 34 of the inlet portion 37a of the molding device 3a.

Figure 12:
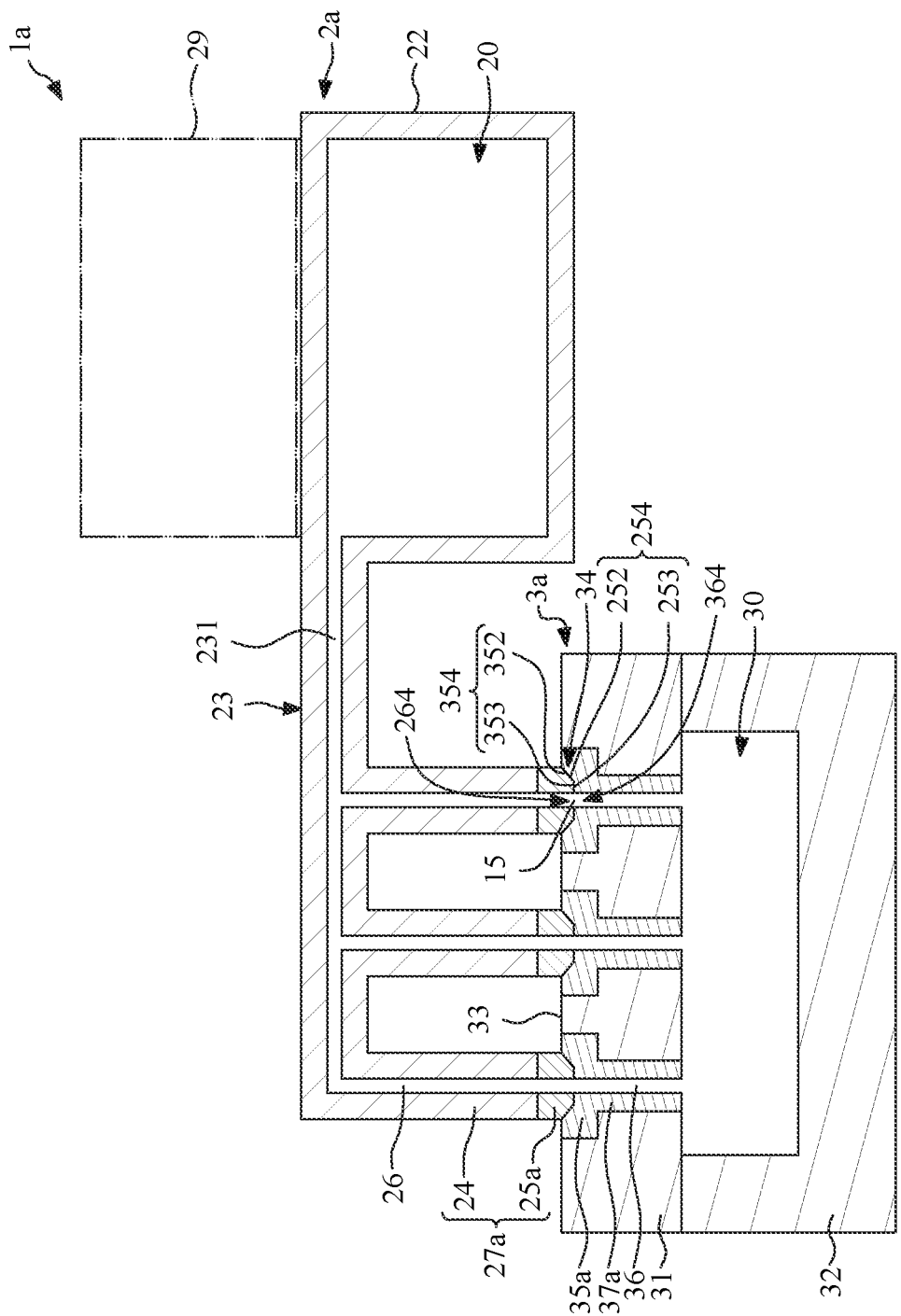
FIG. 12 is a schematic cross-sectional view of the injection molding system of FIG. 10, wherein the injector moves downward to contact the molding device.

FIG. 12 is a schematic cross-sectional view of the injection molding system 1a of FIG. 10, wherein the injector 2a moves downward to contact the molding device 3a. As shown in FIG. 12, the end portion 35a of the inlet portion 37a of the molding device 3a and the end portion 25a of the discharging channel 27a may engage with each other.

Figure 13:
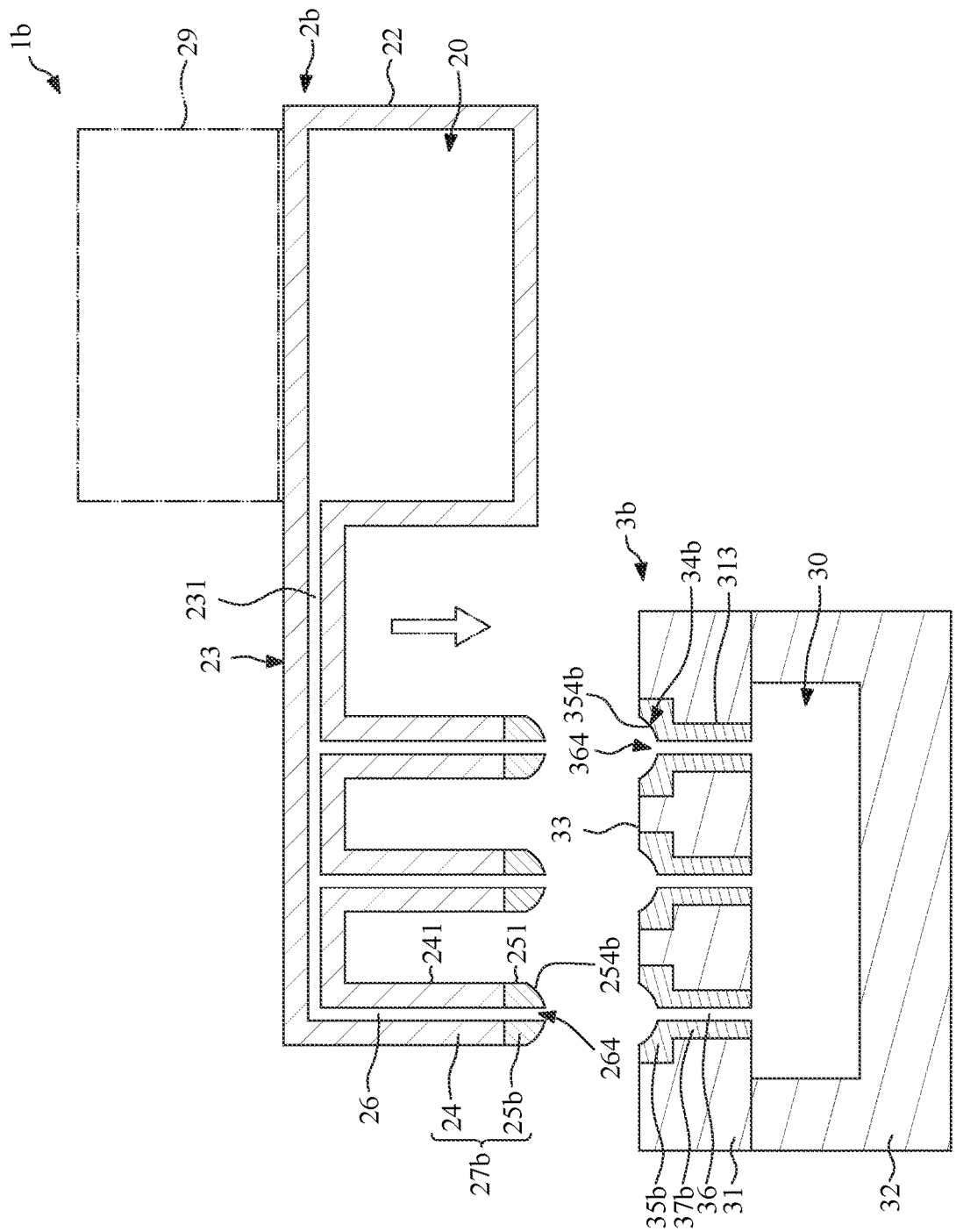
FIG. 13 is a schematic cross-sectional view of an injection molding system according to one embodiment of the present invention.
Figure 14:
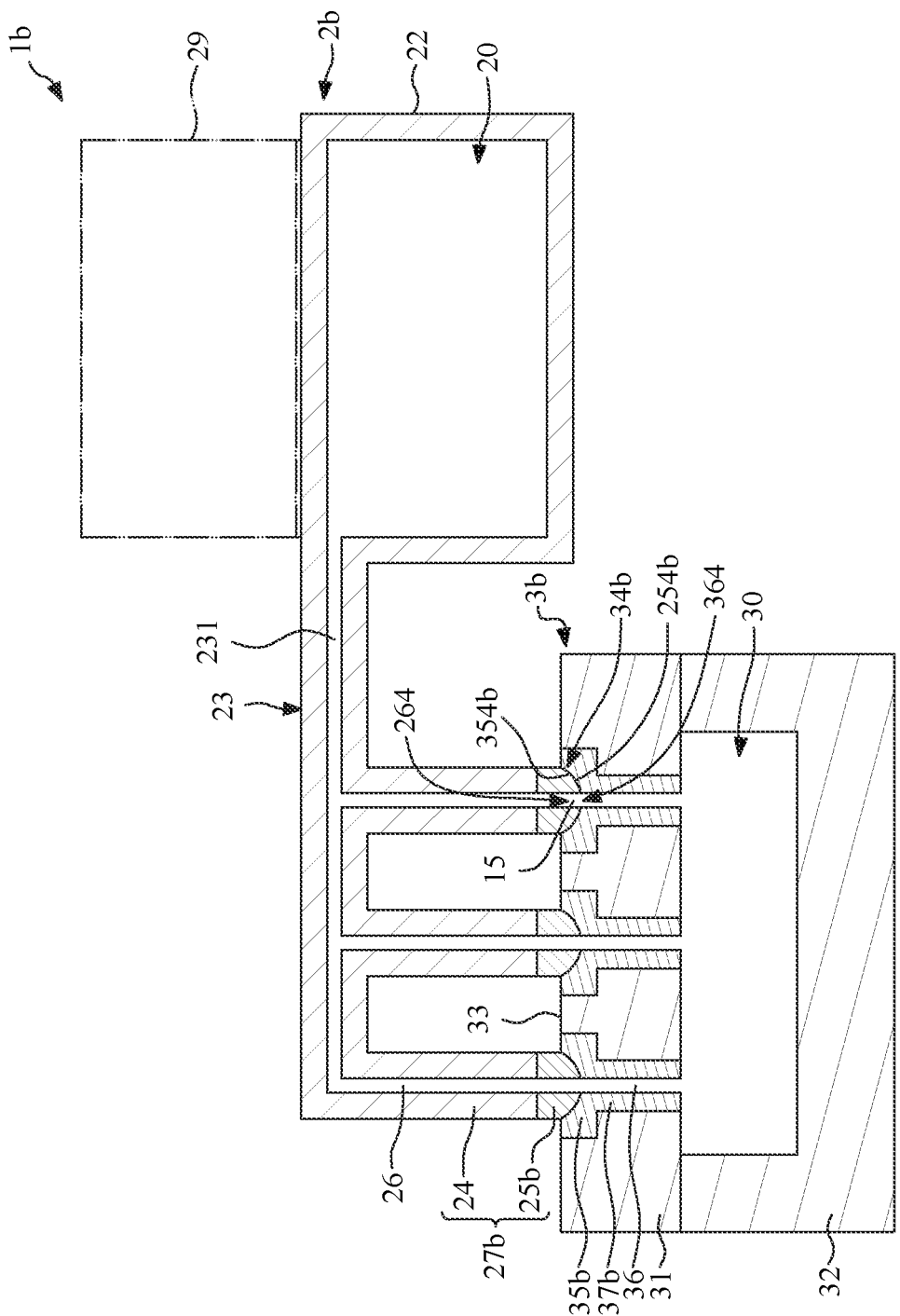
FIG. 14 is a schematic cross-sectional view of the injection molding system of FIG. 13, wherein the injector moves downward to contact the molding device.

FIG. 13 is a schematic cross-sectional view of an injection molding system 1b according to one embodiment of the present invention. FIG. 14 is a schematic cross-sectional view of the injection molding system 1b of FIG. 13, wherein the injector 2b moves downward to contact the molding device 3b. The injection molding system 1b of FIG. 13 may be similar to the injection molding system 1a of FIG. 11, except for structures of the end portion 25b of the discharging channel 27b of the injector 2h and the end portion 35b of the inlet portion 37b of the molding device 3b. As shown in FIG. 13, the end surface 254b of the end portion 25b of the discharging channel 27b of the injector 2b may include a curved surface. For example, the end surface 254b of the end portion 25b of the discharging channel 27b may include a convex surface. In addition, the end surface 354b (or the recessed portion 34b) of the end portion 35b of the inlet portion 37b of the molding device 3b may include a curved surface. For example, the end surface 354b of the end portion 35b of the inlet portion 37b of the molding device 3b may include a concave surface. As shown in FIG. 14, the concave end surface 354b of the end portion 35b (or the recessed portion 34b) of the inlet portion 37b of the molding device 3b may be matched with the convex end surface 254b of the end portion 25b of the discharging channel 27b. Thus, the end portion 35b of the inlet portion 37b of the molding device 3b may be engaged with the end portion 25h of the discharging channel 27b.

Figure 15:
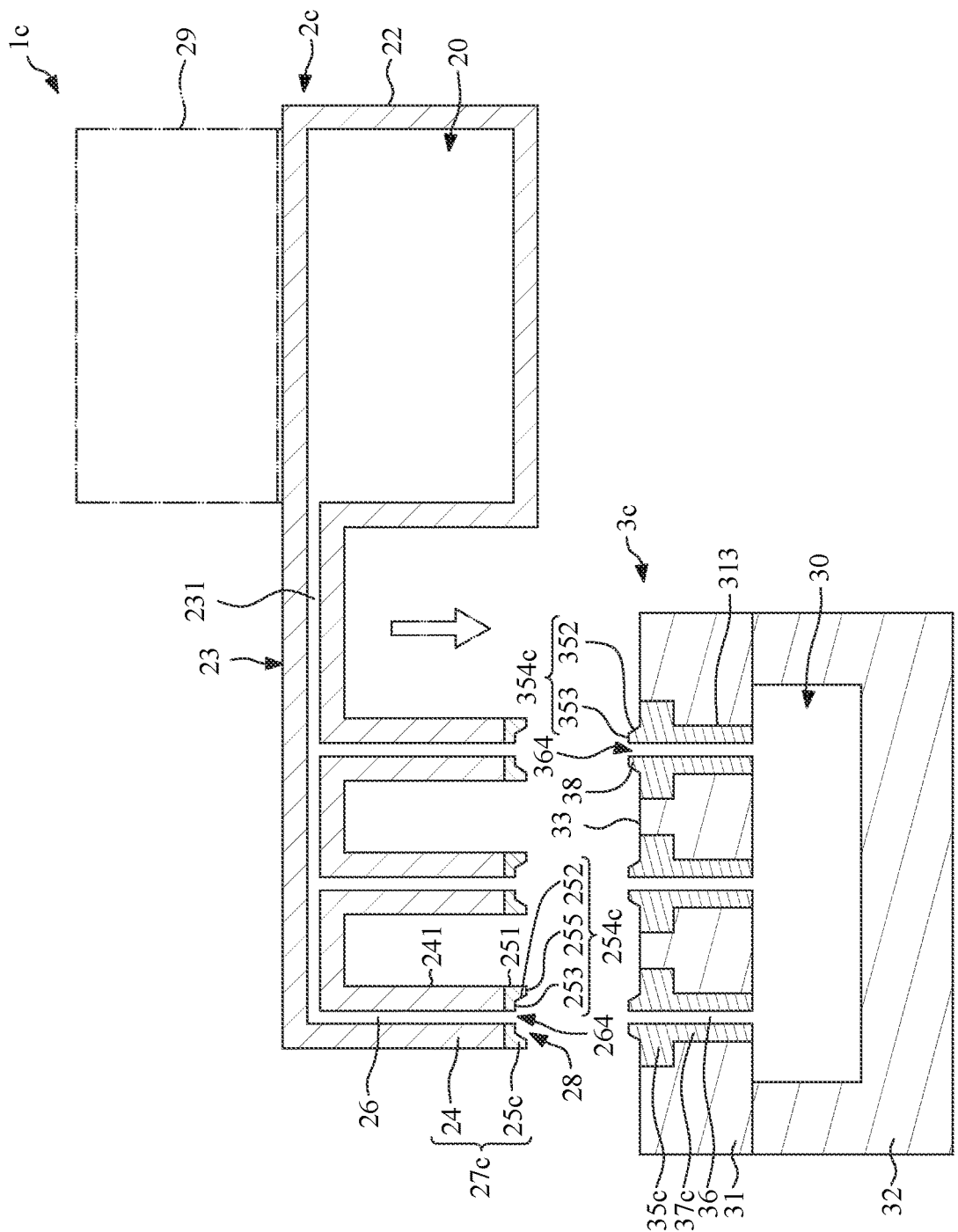
FIG. 15 is a schematic cross-sectional view of an injection molding system according to one embodiment of the present invention.
Figure 16:
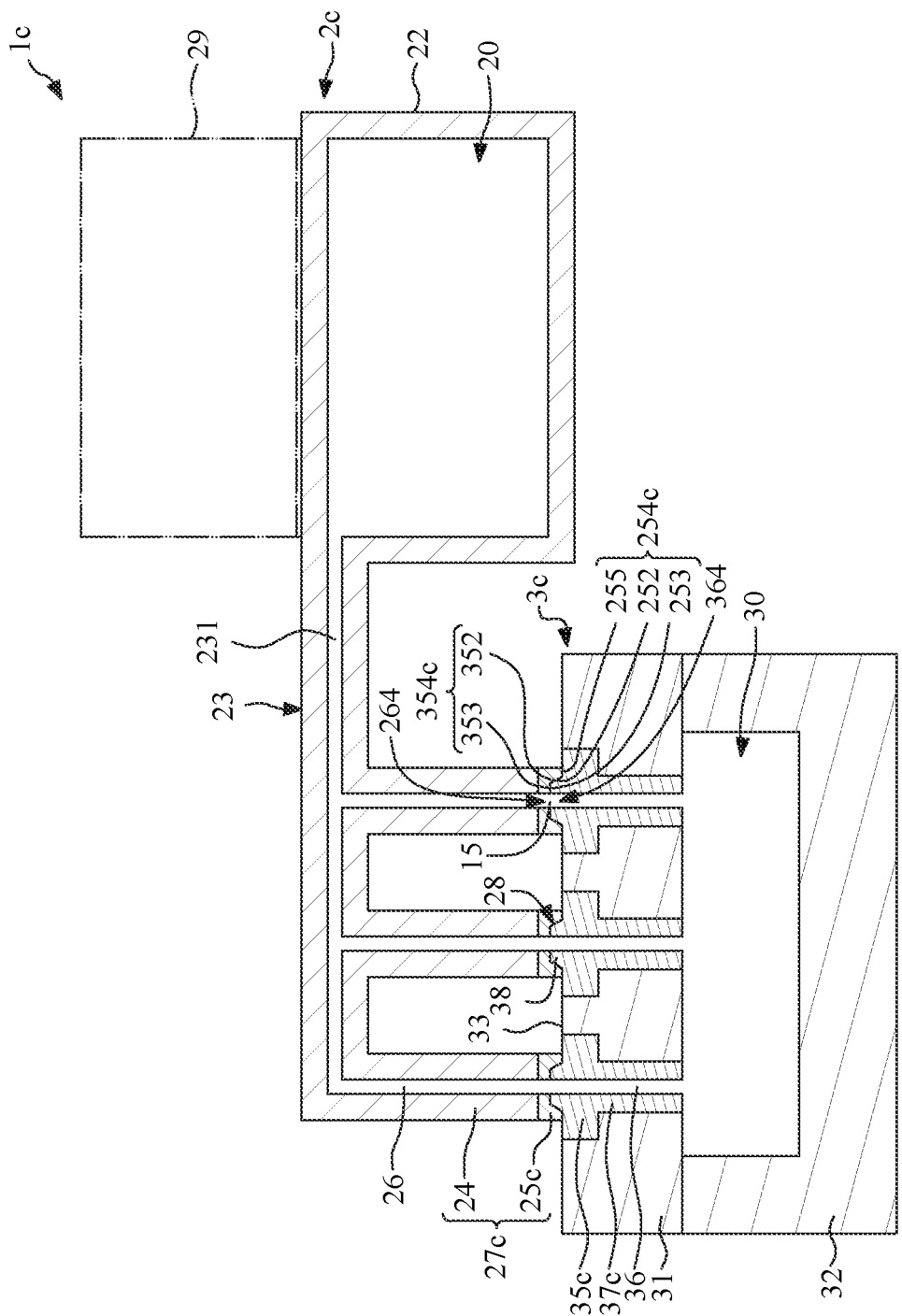
FIG. 16 is a schematic cross-sectional view of the injection molding system of FIG. 15, wherein the injector moves downward to contact the molding device.

FIG. 15 is a schematic cross-sectional view of an injection molding system 1c according to one embodiment of the present invention. FIG. 16 is a schematic cross-sectional view of the injection molding system 1c of FIG. 15, wherein the injector 2c moves downward to contact the molding device 3c. The injection molding system 1c of FIG. 15 may be similar to the injection molding system 1a of FIG. 11, except for structures of the end portion 25c of the discharging channel 27c of the injector 2c and the end portion 35c of the inlet portion 37c of the molding device 3c. As shown in FIG. 15, the end portion 25c of the discharging channel 27c of the injector 2c may define a recessed portion 28, and may have an end surface 254c. The end surface 254c of the end portion 25c may include a first surface 252, a second surface 253 and a third surface 255. The third surface 255 may be the bottom surface of the end portion 25c of the discharging channel 27c. The recessed portion 28 may be recessed from the third surface 255, and may be defined by the first surface 252 and the second surface 253. The recessed portion 28 may be in communication with the second passage 26. The first surface 252, the second surface 253 and the third surface 255 may be not coplanar with each other. The first surface 252 may intersect with the second surface 253 with an angle of greater than 90 degrees. Thus, the end surface 254c of the end portion 25c may be a non-planar surface. The end portion 25c of the discharging channel 27c may have a non-planar end surface 254c. The entire end surface 254c of the end portion 25c may be not a flat surface.

Figure 17:
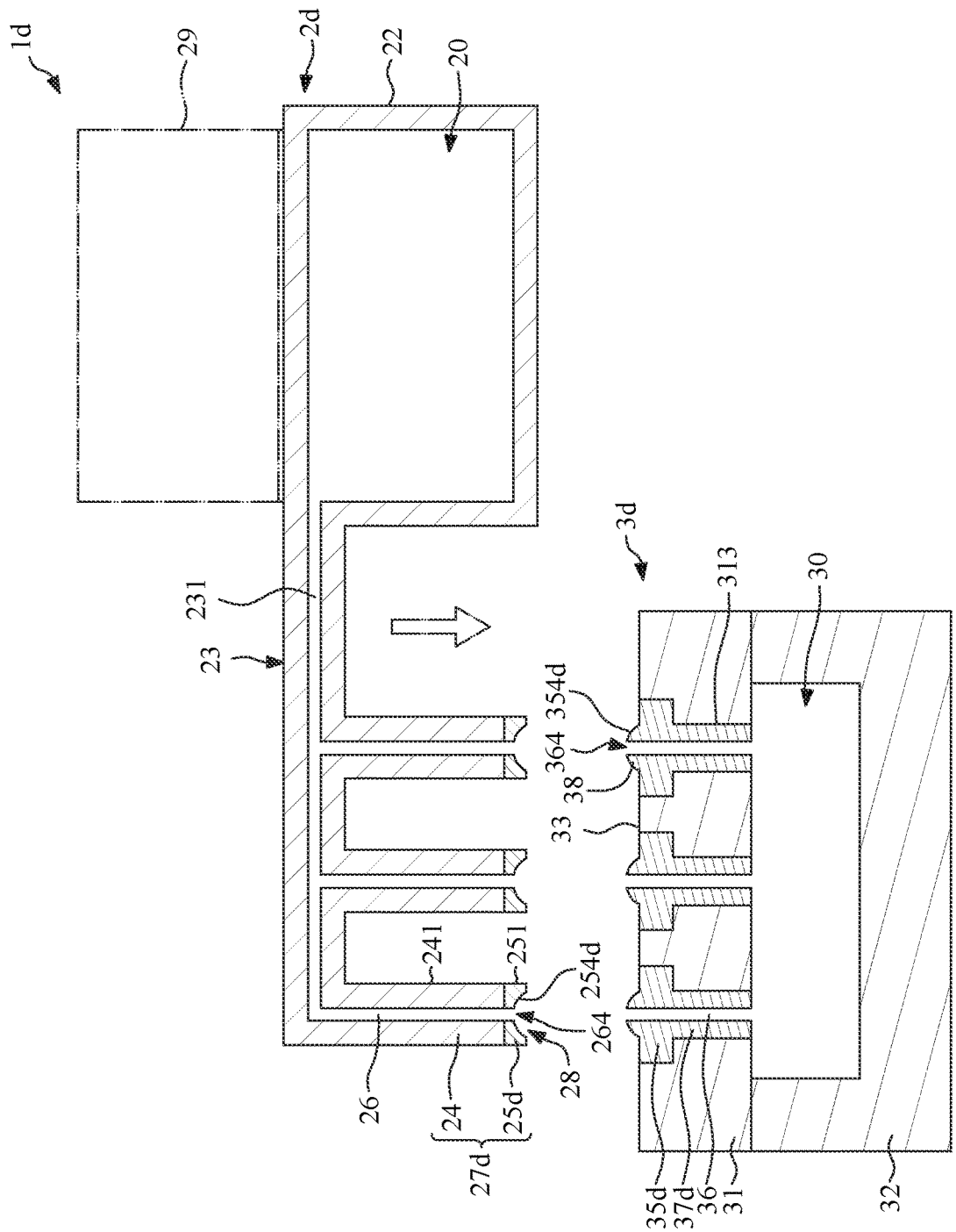
FIG. 17 is a schematic cross-sectional view of an injection molding system according to one embodiment of the present invention.
Figure 18:
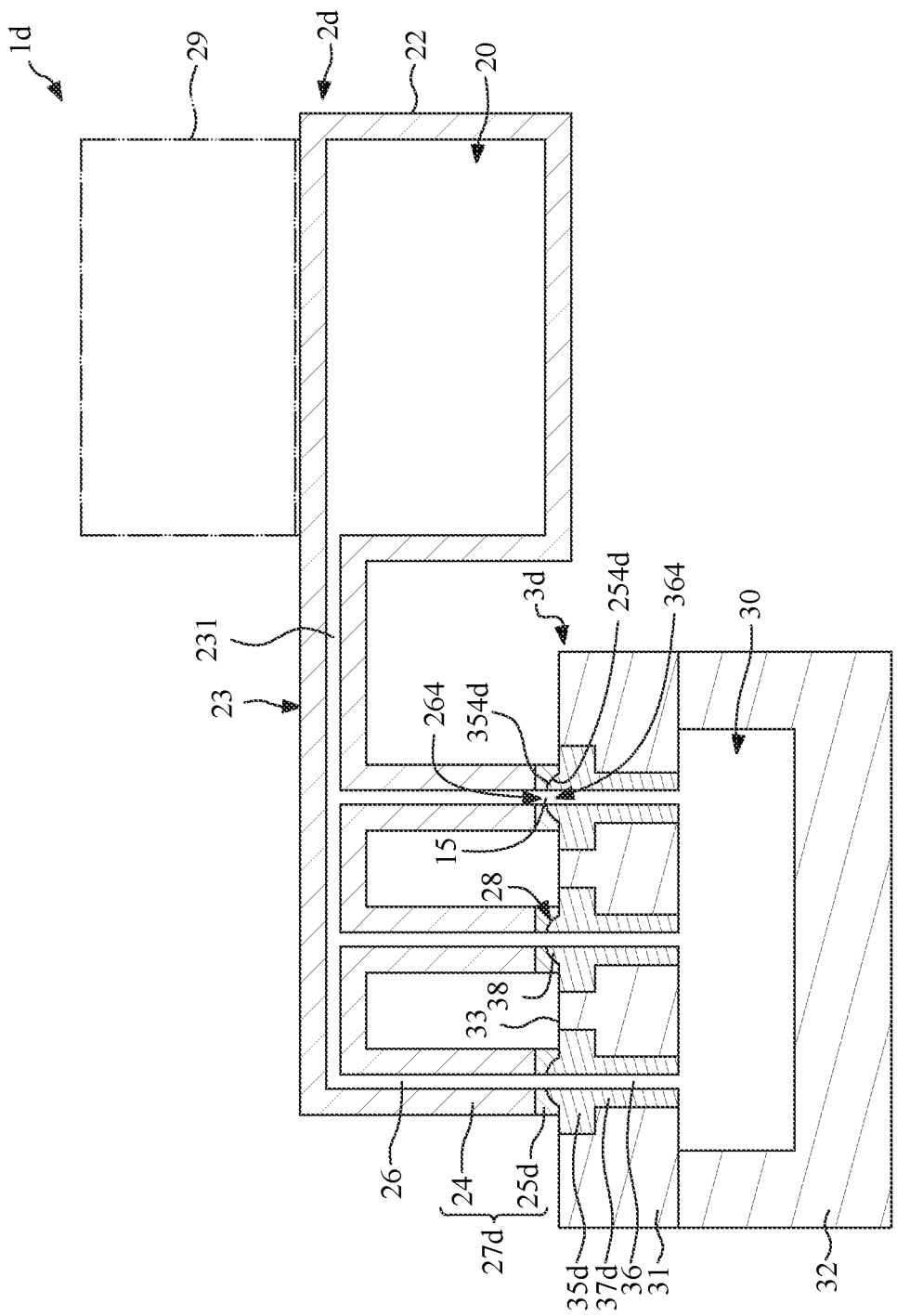
FIG. 18 is a schematic cross-sectional view of the injection molding system of FIG. 17, wherein the injector moves downward to contact the molding device.

The end portion 35c of the inlet portion 37c of the molding device 3c may include a protrusion 38 protruding from the top surface 33 of the molding device 3c. The protrusion 38 may have an end surface 354c. The end surface 354c of the protrusion 38 of the end portion 35c may include a first surface 352 and a second surface 353. The first surface 352, the second surface 353 and the top surface 33 may be not coplanar with each other. The first surface 352 may intersect with the second surface 353 with an angle of greater than 90 degrees. Thus, the end surface 354c of the end portion 35c of the inlet portion 37c may be a non-planar surface, and may protrude from the top surface 33 of the molding device 3c. Further, the first passage 36 may extend through the protrusion 38 of the molding device 3c, and a profile of the protrusion 38 of the molding device 3c may match a profile of the recessed portion 28 of the discharging channel 27c. In some embodiments, the first passage 36 or the opening 364 of the molding device 3c may be communicable with the second passage 26 or the opening 264 of the injector 2c at a connecting point 15. As shown in FIG. 16, an elevation of the connecting point 15 may be higher than an elevation of the top surface 33 of the molding device 3c. In addition, the self-alignment mechanism of the injection molding system 1c may include the recessed portion 28 of the discharging channel 27c and the protrusion 38 of the molding device 3c FIG. 17 is a schematic cross-sectional view of an injection molding system 1d according to one embodiment of the present invention. FIG. 18 is a schematic cross-sectional view of the injection molding system 1d of FIG. 17, wherein the injector 2d moves downward to contact the molding device 3d. The injection molding system 1d of FIG. 17 may be similar to the injection molding system 1c of FIG. 15, except for structures of the end portion 25d of the discharging channel 27d of the injector 2d and the end portion 35d of the inlet portion 37d of the molding device 3d. As shown in FIG. 17, the end surface 254d (or the recessed portion 28) of the end portion 25d of the discharging channel 27d of the injector 2d may include a curved surface. For example, the end surface 254d of the end portion 25d of the discharging channel 27d may include a concave surface. In addition, the end surface 354d (or the protrusion 38) of the end portion 35d of the inlet portion 37d of the molding device 3d may include a curved surface. For example, the end surface 354d of the end portion 35d of the inlet portion 37d of the molding device 3d may include a convex surface. As shown in FIG. 18, the convex end surface 354d of the end portion 35d of the inlet portion 37d of the molding device 3d may be matched with the concave end surface 254d of the end portion 25d of the discharging channel 27d. Thus, the end portion 35d of the inlet portion 37d of the molding device 3d may be engaged with the end portion 25d of the discharging channel 27d.

Figure 19:
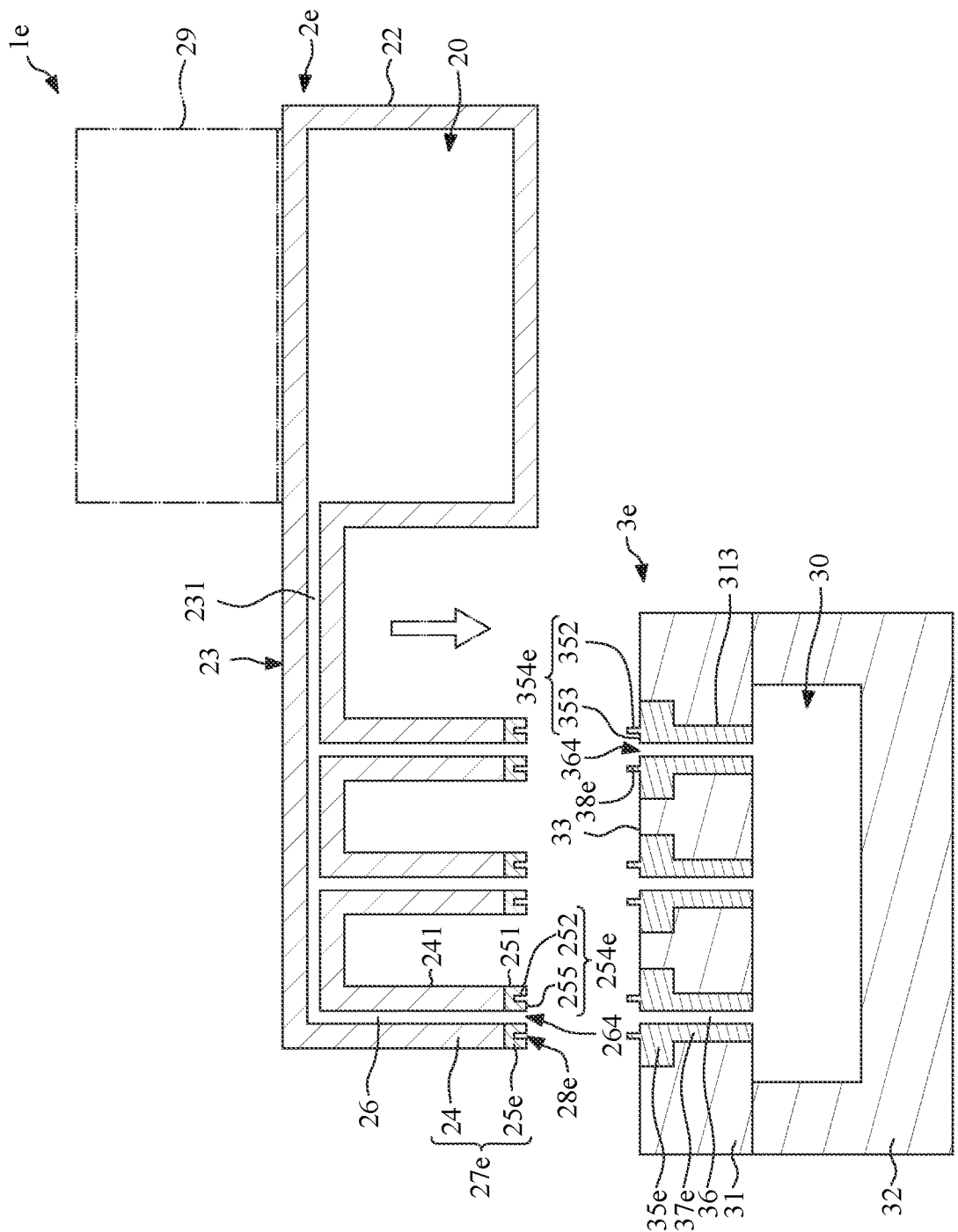
FIG. 19 is a schematic cross-sectional view of an injection molding system according to one embodiment of the present invention.
Figure 20:
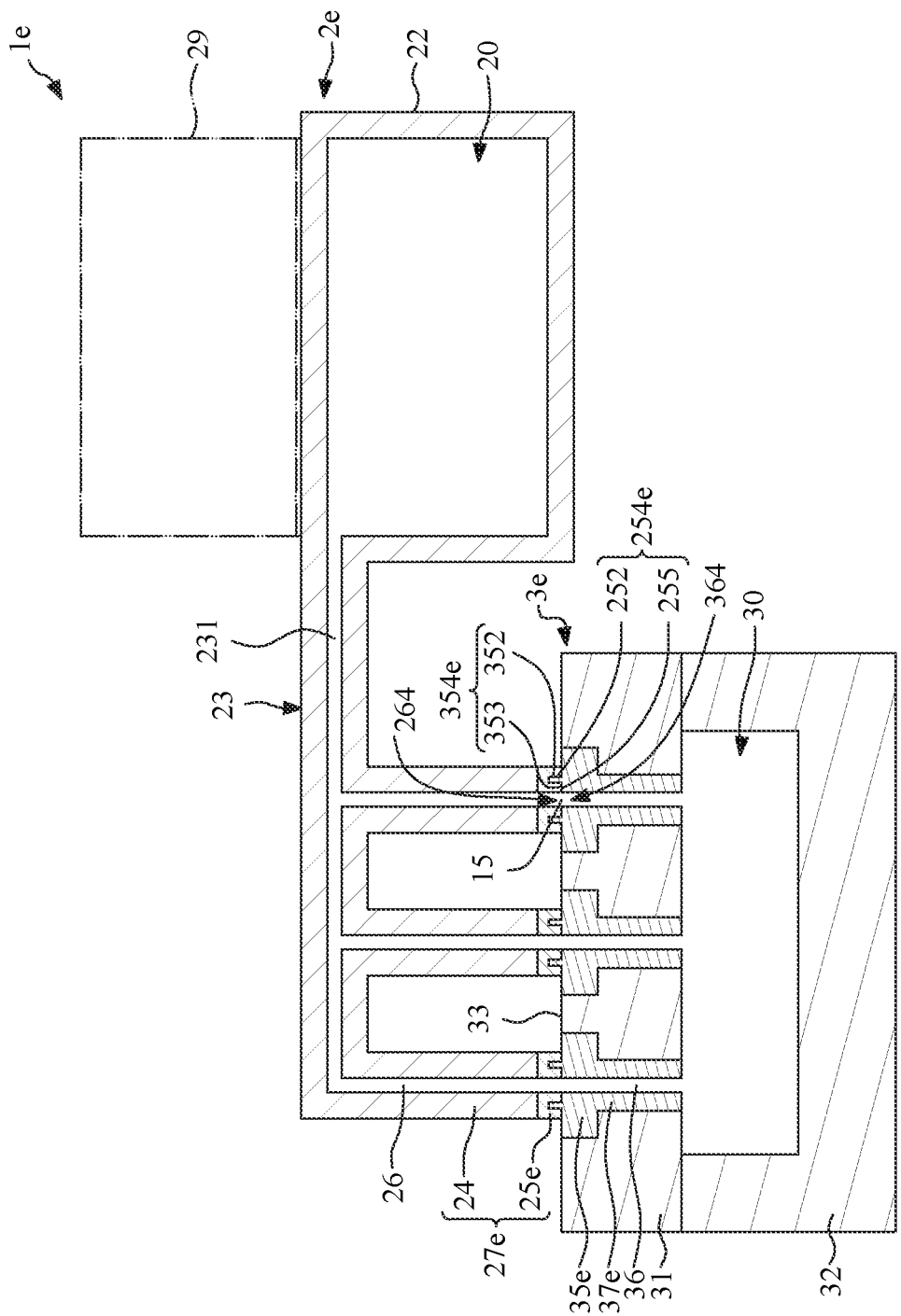
FIG. 20 is a schematic cross-sectional view of the injection molding system of FIG. 19, wherein the injector moves downward to contact the molding device.

FIG. 19 is a schematic cross-sectional view of an injection molding system 1e according to one embodiment of the present invention. FIG. 20 is a schematic cross-sectional view of the injection molding system 1e of FIG. 19, wherein the injector 2e moves downward to contact the molding device 3e. The injection molding system 1e of FIG. 19 may be similar to the injection molding system 1c of FIG. 15, except for structures of the end portion 25e of the discharging channel 27e of the injector 2e and the end portion 35e of the inlet portion 37e of the molding device 3e. As shown in FIG. 19, the end portion 25e of the discharging channel 27e of the injector 2e may define a recessed portion 28e, and may have an end surface 254e. The recessed portion 28e may be recessed from the third surface 255 and may be defined by the first surface 252. Thus, the end surface 254e of the end portion 25e may include the first surface 252 and the third surface 255. The recessed portion 28e may not be in communication with the second passage 26. The recessed portion 28e may be a positioning hole or an annular groove.

The end portion 35e of the inlet portion 37e of the molding device 3e may include a protrusion 38e protruding from the top surface 33 of the molding device 3e. The protrusion 38c may have an end surface 354e. The end surface 354e of the protrusion 38e of the end portion 35e may include a first surface 352 and a second surface 353. The first passage 36 may not extend through the protrusion 38e of the molding device 3e. The protrusion 38e may be a positioning pin or an annular wall. A profile of the protrusion 38e of the molding device 3e may match a profile of the recessed portion 28e of the discharging channel 27e.

Figure 21:
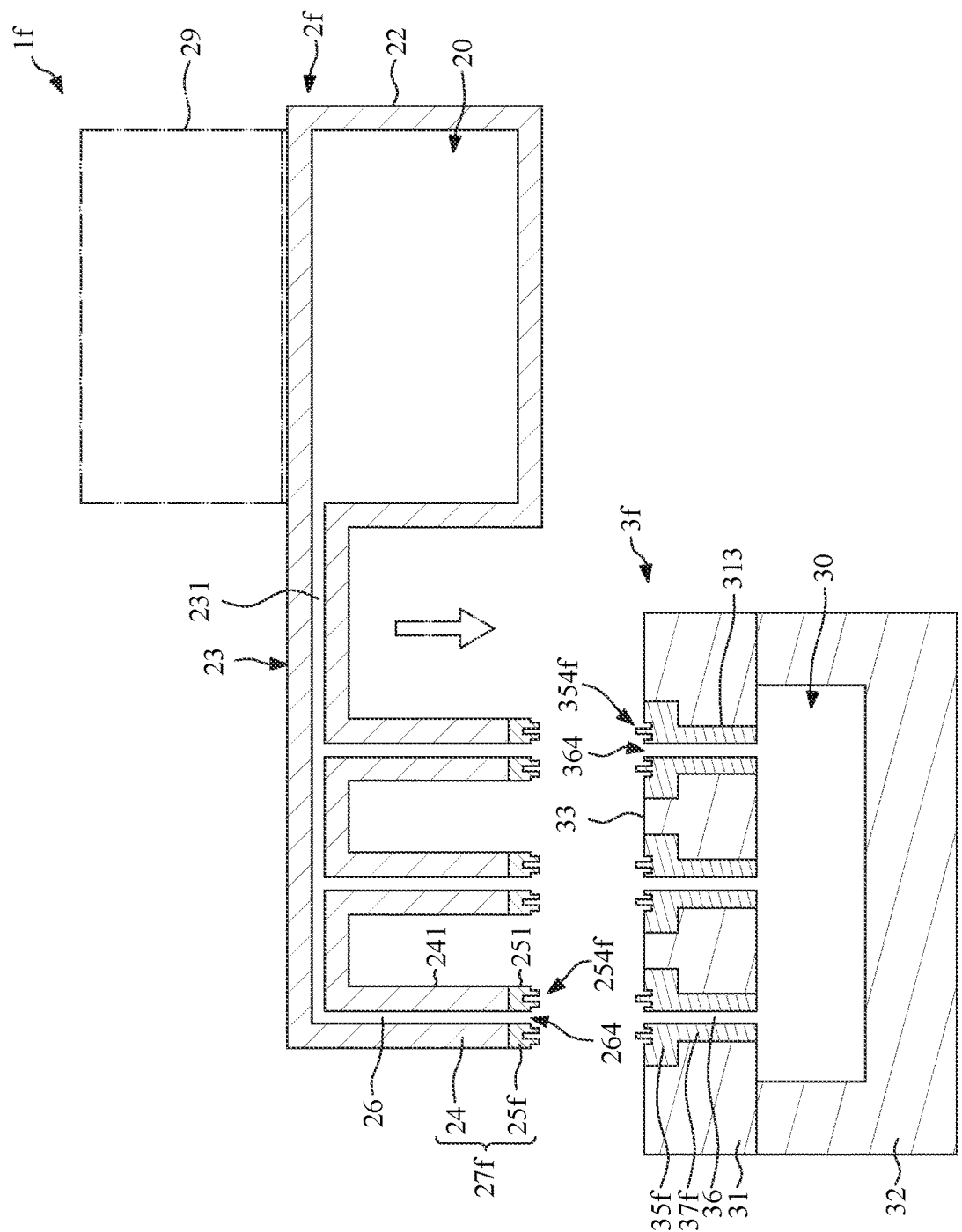
FIG. 21 is a schematic cross-sectional view of an injection molding system according to one embodiment of the present invention.
Figure 22:
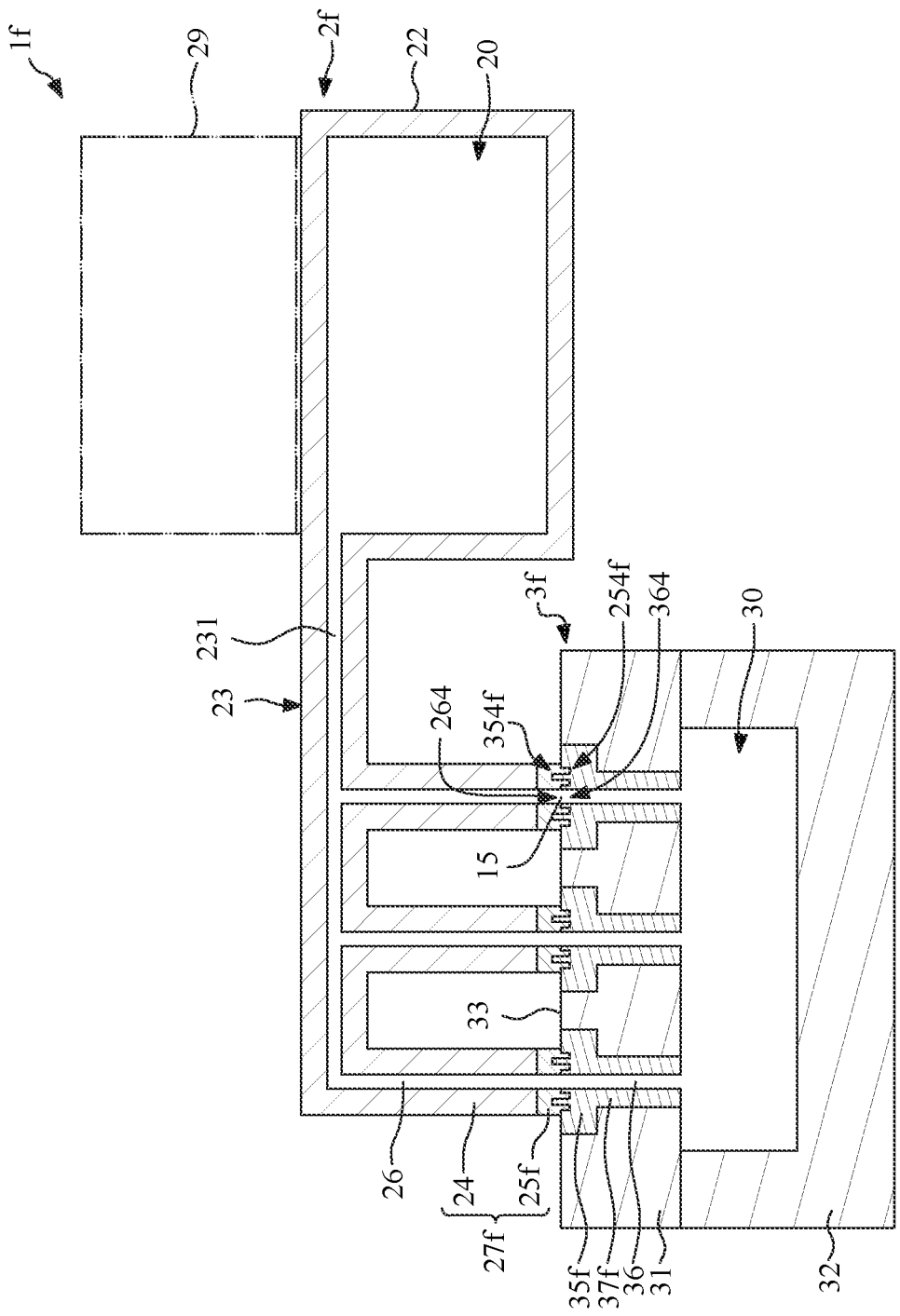
FIG. 22 is a schematic cross-sectional view of the injection molding system of FIG. 21, wherein the injector moves downward to contact the molding device.

FIG. 21 is a schematic cross-sectional view of an injection molding system 1f according to one embodiment of the present invention. FIG. 22 is a schematic cross-sectional view of the injection molding system 1f of FIG. 21, wherein the injector 2f moves downward to contact the molding device 3f. The injection molding system 1f of FIG. 21 may be similar to the injection molding system 1c of FIG. 15, except for structures of the end portion 25f of the discharging channel 27f of the injector 2f and the end portion 35f of the inlet portion 37f of the molding device 3f. As shown in FIG. 21, the end portion 25f of the discharging channel 27f of the injector 2f may have an uneven end surface 254f. There may be protrusion(s) and recessed portion(s) on the end surface 254f. In addition, the end portion 35f of the inlet portion 37f of the molding device 3f may have an uneven end surface 354f. There may be protrusion(s) and recessed portion(s) on the end surface 354f. A profile of the uneven end surface 354f of the end portion 35f of the inlet portion 37f of the molding device 3f may match a profile of the uneven end surface 254f of the end portion 25f of the discharging channel 27f of the injector 2f. Thus, the uneven end surface 354f of the end portion 35f may be contacted or engaged with the uneven end surface 254f of the end portion 25f.

Figure 23:
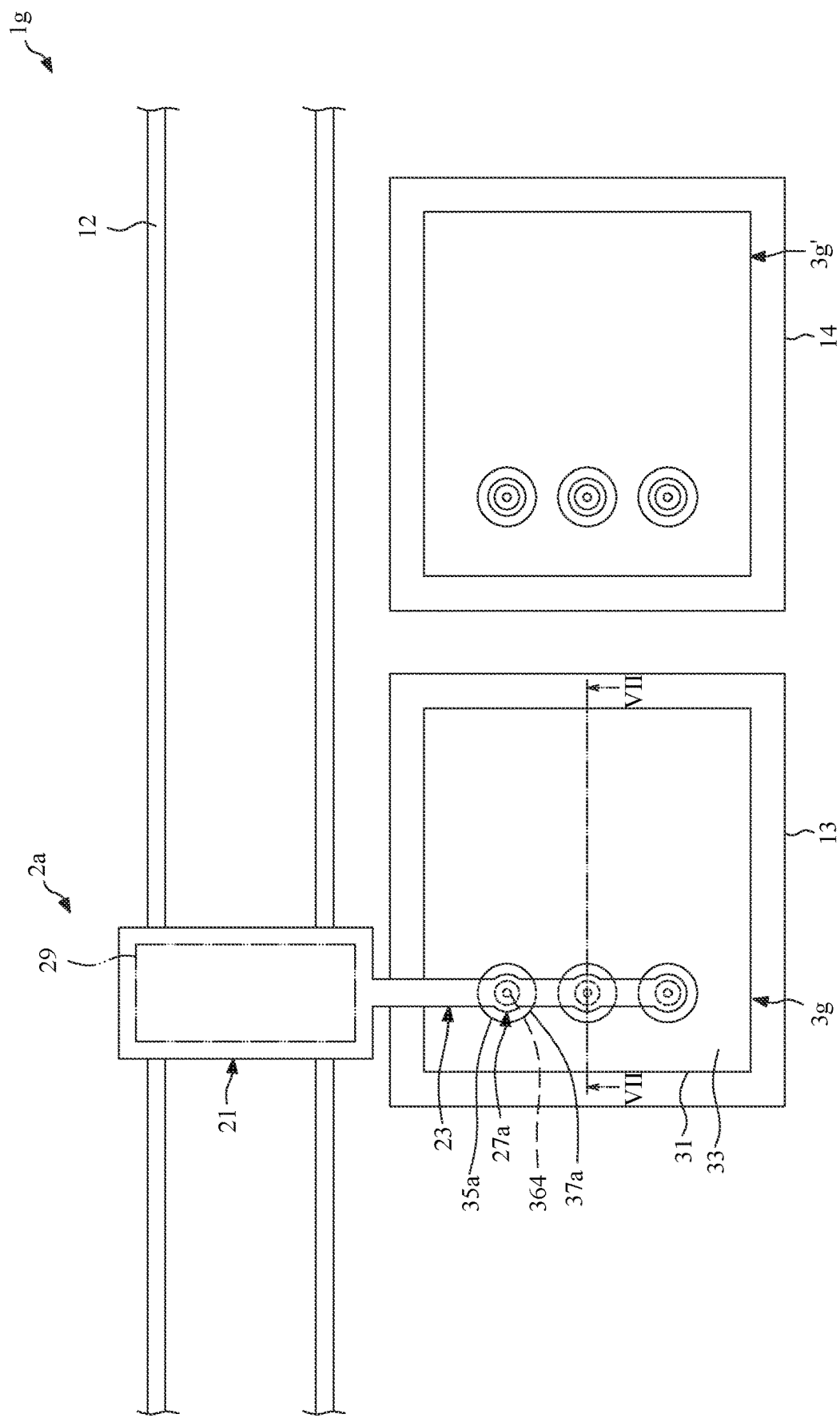
FIG. 23 is a schematic top view of an injection molding system according to one embodiment of the present invention.
Figure 24:
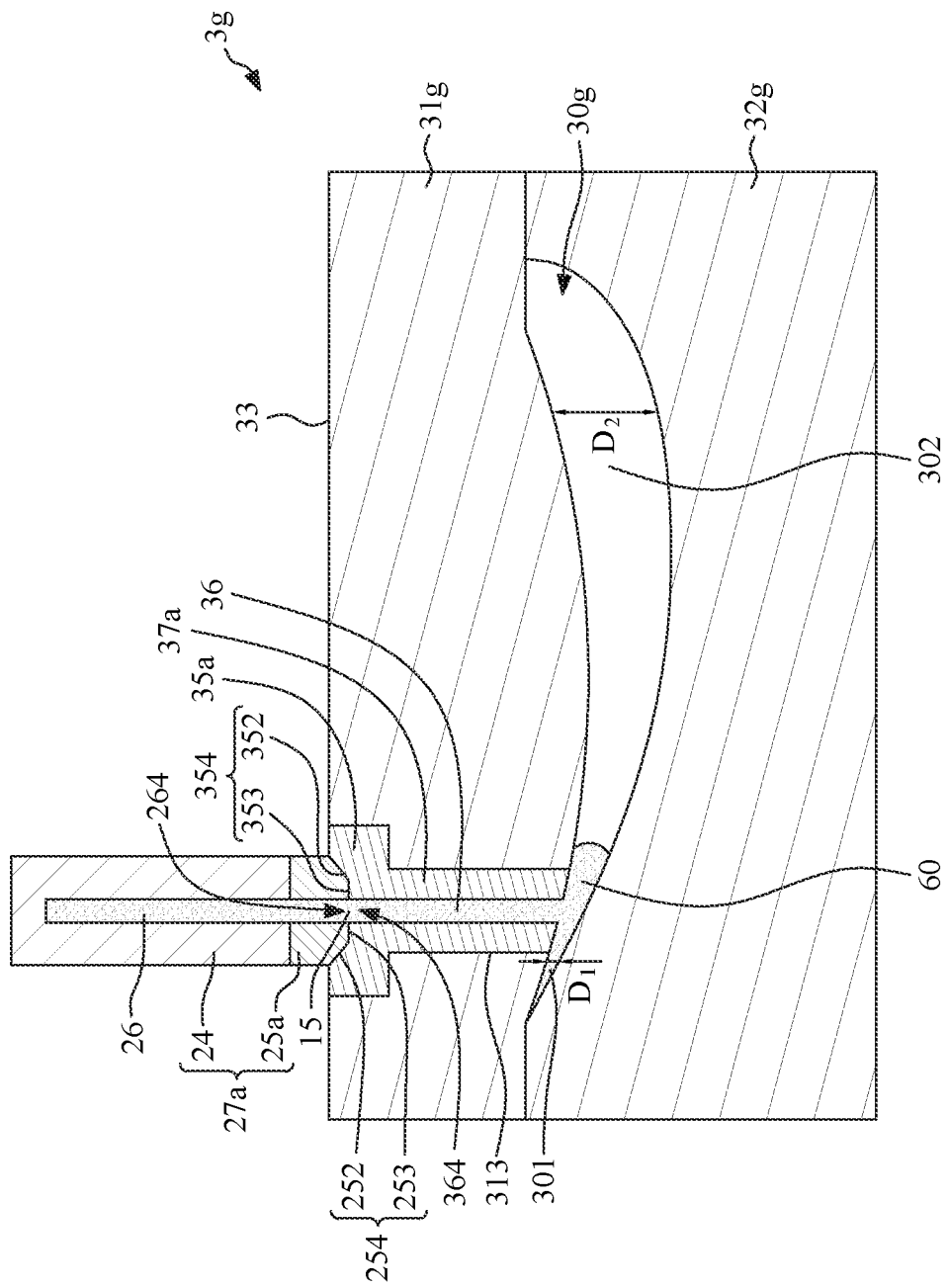
FIG. 24 is a schematic cross-sectional view illustrating the molding device taken along line VII-VII of FIG. 23.

FIG. 23 is a schematic top view of an injection molding system 1g according to one embodiment of the present invention. FIG. 24 is a schematic cross-sectional view illustrating the molding device 3g taken along line VIII-VII of FIG. 23. The injection molding system 1g of FIG. 23 may be similar to the injection molding system 1a of FIG. except for a structure of the molding device 3g, 3g'. The molding device 3g of FIG. 24 may be similar to the molding device 3a of FIG. 11, except for a dimension of the mold cavity 30g defined by the upper mold 31g and the lower mold 32g. As shown in FIG. 24, the mold cavity 30g may include a first portion 301 and a second portion 302. The first portion 301 may have a first depth $D_1$, the second portion 302 may have a second depth $D_2$, and the first depth $D_1$ is less than the second depth $D_2$. For example, the depth of the mold cavity 30g may increase from the left side toward the right side. The inlet portion 37a may be closer to the first portion 301 than to the second portion 302. That is, the inlet portion 37a may be disposed at a location corresponding to a relative small depth of the mold cavity 30g. Alternatively, the inlet portion 37a may be closer to a portion of the mold cavity 30g having a minimum depth than to a portion of the mold cavity 30g having a maximum depth.

Figure 25:
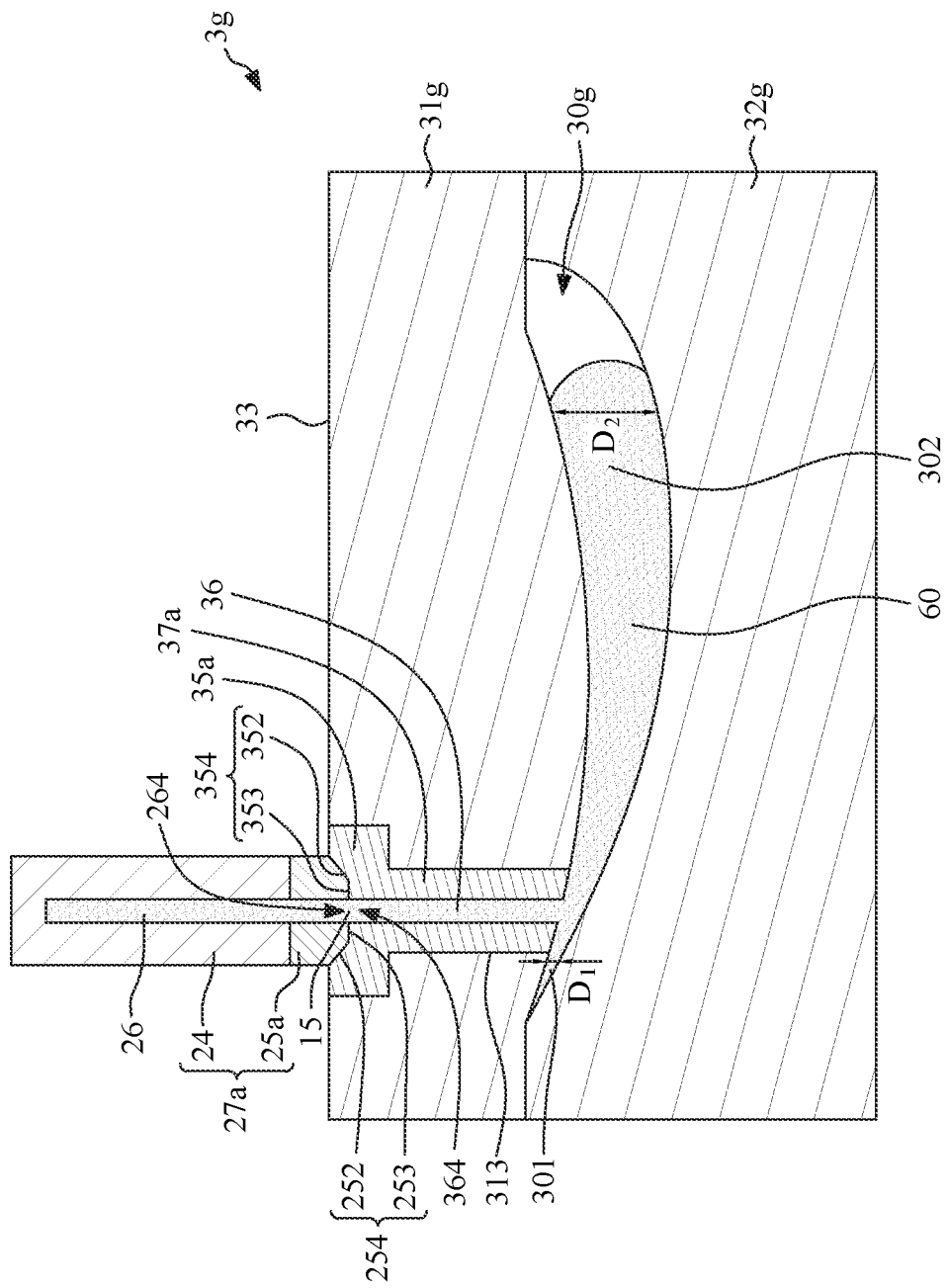
FIG. 25 is a schematic cross-sectional view illustrating the flow of the mixture in the molding device of FIG. 24.
Figure 26:
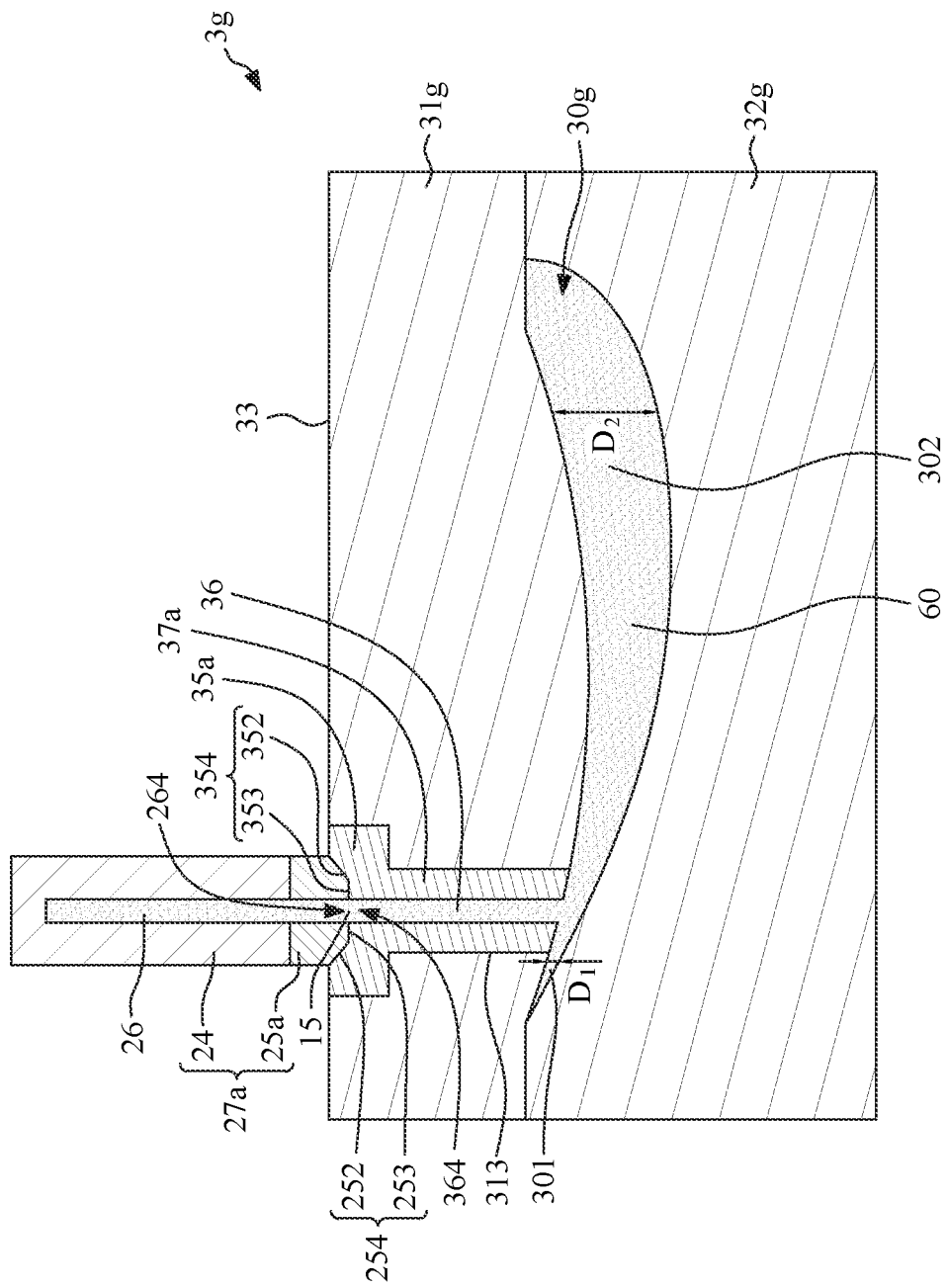
FIG. 26 is a schematic cross-sectional view illustrating the mixture fills the mold cavity of the molding device of FIG. 24.

FIG. 25 is a schematic cross-sectional view illustrating the flow of the mixture in the molding device 3g of FIG. 24. FIG. 26 is a schematic cross-sectional view illustrating the mixture 60 fills the mold cavity 30g of the molding device 3g of FIG. 24. As shown in FIG. 24, the mixture 60 may enter the first portion 301 of the mold cavity 30g through the discharging channel 27a and the inlet portion 37a. Then, the mixture 60 may flow toward the second portion 302 of the mold cavity 30g, as shown in FIG. 25. Then, the mixture 60 may till the mold cavity 30g. Since the mixture 60 flows from a narrow portion (e.g., the first portion 301) to a wide portion (e.g., the second portion 302), a resistance is less, and the flow may be smooth. Thus, the foamed polymeric article obtained may have better quality such as the desired predetermined shape and property.

Figure 27:
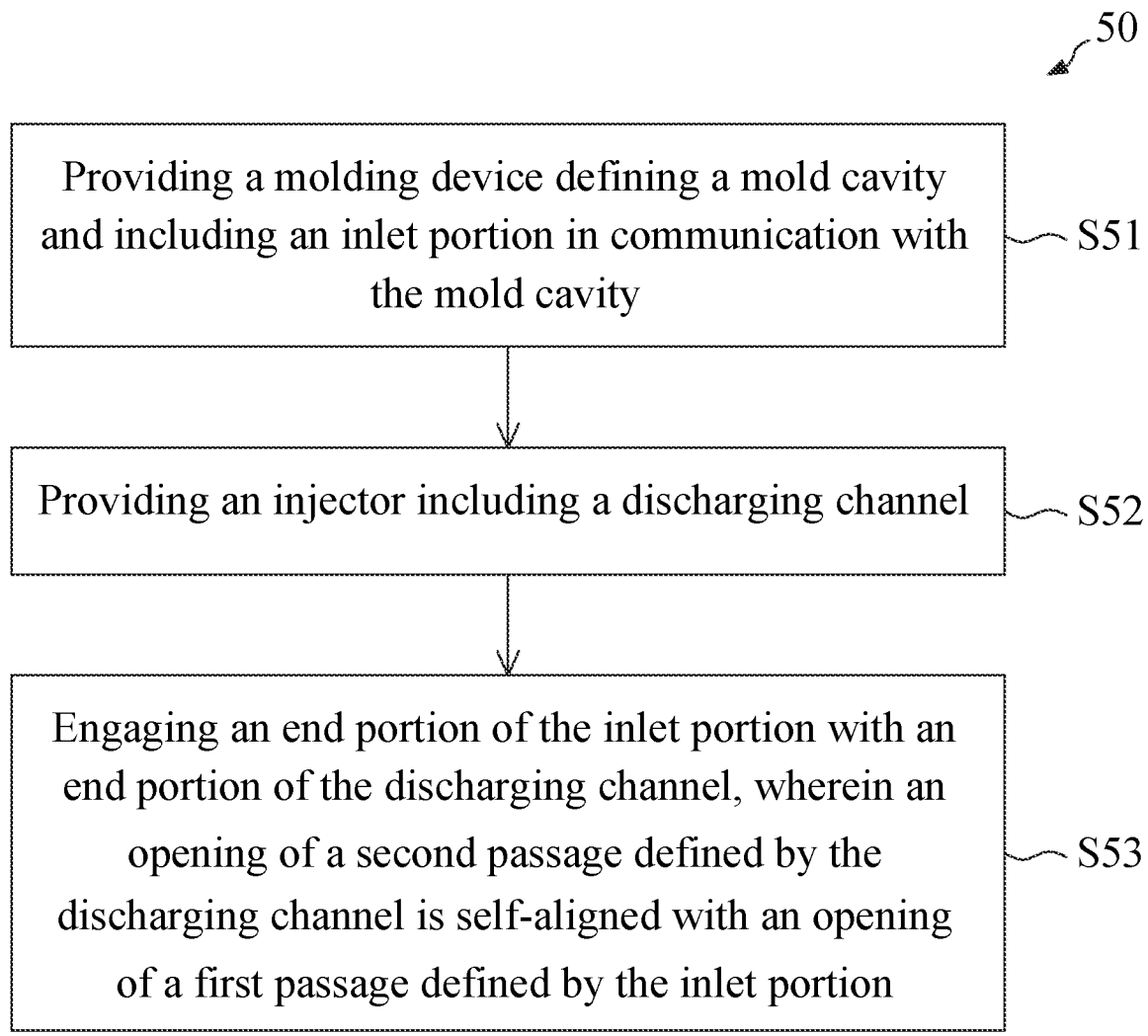
FIG. 27 is a flow chart illustrating an injection molding method according to some embodiments of the present invention.

FIG. 27 is a flow chart illustrating an injection molding method according to some embodiments of the present invention. As shown in FIG. 27, the injection molding method 50 may include the following steps.

In some embodiments, the method 50 may include a step S51: providing a molding device defining a mold cavity and including an inlet portion in communication with the mold cavity. For example, as shown in FIG. 3, a molding device 3 is provided. The molding device 3 may include an upper mold 31 and a lower mold 32 opposite to the upper mold 31. The molding device 3 (including the upper mold 31 and the lower mold 32) may define a mold cavity 30 and a first passage 36 in communication with the mold cavity 30. The upper mold 31 of the molding device 3 may include an inlet portion 37. The inlet portion 37 may include an end portion 35. The first passage 36 may extend through the inlet portion 37. Thus, the inlet portion 37 may be in communication with the mold cavity 30. The first passage 36 may have an opening 364 at the end surface 354 of the end portion 35 of the inlet portion 37.

In some embodiments, the method 50 may include a step S52: providing an injector including a discharging channel. For example, as shown in FIG. 2, an injector 2 is provided. The injector 2 may include a main portion 21, an extending portion 23 and at least one discharging channel 27. The main portion 21 may define an accommodation space 20 by sidewall 22. The extending portion 23 may extend from the main portion 21. The extending portion 23 may define a connection passage 231 that is in communication with the accommodation space 20. The discharging channel 27 may extend from the extending portion 23. The discharging channel 27 may define a second passage 26 that is in communication with the connection passage 231 and the accommodation space 20. The discharging channel 27 may include a main portion 24 and an end portion 25. The end portion 25 may have an end surface 254. The second passage 26 may extend through the main portion 24 and the end portion 25, and may have an opening 264 at the end surface 254 of the end portion 25.

In some embodiments, the method 50 may include a step S53: engaging an end portion of the inlet portion with an end portion of the discharging channel, wherein an opening of a second passage defined by the discharging channel is self-aligned with an opening of a first passage defined by the inlet portion. For example, as shown in FIG. 5 and FIG. 6, since the end surface 354 of the end portion 35 of the inlet portion 37 of the molding device 3 and the end surface 254 of the end portion 25 of the discharging channel 27 may be complementary with each other, the end portion 35 of the inlet portion 37 of the molding device 3 may engage with the end portion 25 of the discharging channel 27. In some embodiments, the second passage 26 or the opening 264 of the second passage 26 of the discharging channel 27 may be self-aligned with the first passage 36 or the opening 364 of the first passage 36 of the inlet portion 37 of the molding device 3.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein, may be utilized according to the present invention. Accordingly, the appended claims are intended to include within their scope such processes, machines, manufacture, compositions of matter, means, methods and steps.

What is claimed is:

1. An injection molding system, comprising:
a molding device defining a mold cavity and including an inlet portion in communication with the mold cavity, wherein the inlet portion includes an end portion having an end surface, and the end surface of the inlet portion includes a first surface and a second surface non-coplanar with each other; and
an injector including a discharging channel, wherein the discharging channel includes an end portion having an end surface, and the end surface of the discharging channel includes a first surface and a second surface non-coplanar with each other,
wherein the first surface of the end surface of the discharging channel entirely contacts the first surface of the end surface of the inlet portion, and the second surface of the end surface of the discharging channel entirely contacts the second surface of the end surface of the inlet portion,
wherein in a cross-sectional view, a length of the first surface of the end surface of the discharging channel is substantially equal to a length of the first surface of the end surface of the inlet portion, and a width of the second surface of the end surface of the discharging channel is substantially equal to a width of the second surface of the end surface of the inlet portion,
wherein the discharging channel defines a passage having an opening at the second surface, and a width of the passage is less than the width of the second surface of the end surface of the discharging channel,
wherein the second surface of the end surface of the inlet portion is substantially parallel with a top surface of the molding device.

2. The injection molding system of claim 1, wherein the end surface of the end portion of the inlet portion is recessed from the top surface of the molding device.

3. The injection molding system of claim 1, wherein the end surface of the end portion of the inlet portion protrudes from the top surface of the molding device.

4. An injection molding system, comprising:
a molding device defining a mold cavity and including an inlet portion in communication with the mold cavity, wherein the inlet portion includes an end portion having an end surface, and the end surface of the inlet portion includes a first surface, a second surface and a third surface non-coplanar with each other, wherein the first surface connects the second surface and the third surface, wherein the mold cavity includes a first portion having a first depth and a second portion having a second depth, the first depth is less than the second depth, and the inlet portion is closer to the first portion than to the second portion; and
an injector including a discharging channel, wherein the discharging channel includes an end portion having an end surface, and the end surface of the discharging channel includes a first surface, a second surface and a third surface non-coplanar with each other, wherein the first surface connects the second surface and the third surface, wherein the first surface of the end surface of the discharging channel entirely contacts the first surface of the end surface of the inlet portion, and the second surface of the end surface of the discharging channel entirely contacts the second surface of the end surface of the inlet portion,
wherein the third surface of the end surface of the discharging channel is vertical to and intersects with the third surface of the end surface of the inlet portion;
wherein in a cross-sectional view, a length of the first surface of the end surface of the discharging channel is substantially equal to a length of the first surface of the end surface of the inlet portion, and a width of the second surface of the end surface of the discharging channel is substantially equal to a width of the second surface of the end surface of the inlet portion,
wherein the discharging channel defines a passage having an opening at the second surface, and a width of the passage is less than the width of the second surface of the end surface of the discharging channel,
wherein the second surface of the end surface of the inlet portion is substantially parallel with a top surface of the molding device.

5. The injection molding system of claim 4, wherein the molding device further defines a first passage extending through the inlet portion and in communication with the mold cavity, the injector further defines an accommodation space, the discharging channel defines a second passage in communication with the accommodation space, and the injection molding system further comprises a self-alignment mechanism for aligning an opening of the first passage of the molding device with an opening of the second passage of the injector, wherein the first passage has a substantially consistent width, the second passage has a substantially consistent width, and the width of the first passage is substantially equal to the width of the second passage.

6. The injection molding system of claim 5, wherein the self-alignment mechanism includes a recessed portion of the molding device and the end portion of the discharging channel, the recessed portion is recessed from a surface of the molding device and in communication with the first passage, and a profile of the end portion of the discharging channel matches a profile of the recessed portion.

7. The injection molding system of claim 6, wherein the end portion of the discharging channel is configured to dispose within the recessed portion of the molding device.

8. The injection molding system of claim 6, wherein the recessed portion tapers toward the first passage.

9. The injection molding system of claim 5, wherein the self-alignment mechanism includes a recessed portion of the discharging channel and a protrusion of the molding device, the recessed portion is recessed from a surface of the discharging channel and in communication with the second passage, the first passage extends through the protrusion of the molding device, and a profile of the protrusion of the molding device matches a profile of the recessed portion of the discharging channel.

10. The injection molding system of claim 9, wherein the protrusion of the molding device has a convex surface matched with a concave surface of the recessed portion of the discharging channel.

11. The injection molding system of claim 5, wherein the first passage of the molding device is communicable with the second passage of the injector at a connecting point, the connecting point is not leveled with a surface of the molding device.

12. The injection molding system of claim 1, wherein the molding device includes a first mold and a second mold, the first mold and the second mold jointly define the mold cavity, the first mold includes the inlet portion and a first passage, the first passage extends through the inlet portion and is in communication with the mold cavity, and the non-planar end surface of the end portion of the inlet portion is connected to a top surface of the first mold of the molding device.

13. The injection molding system of claim 12, wherein the inlet portion is detachably disposed in the first mold, and is exposed in the mold cavity.

14. The injection molding system of claim 4, wherein the molding device includes a first mold and a second mold, the first mold and the second mold jointly define the mold cavity, the first mold includes the inlet portion and a first passage, the first passage extends through the inlet portion and is in communication with the mold cavity, and the non-planar end surface of the end portion of the inlet portion is connected to a top surface of the first mold of the molding device.

15. The injection molding system of claim 14, wherein the inlet portion is detachably disposed in the first mold, and is exposed in the mold cavity.

16. The injection molding system of claim 1, wherein the molding device defines a first passage extending through the inlet portion and in communication with the mold cavity, the first passage has a substantially consistent width, the discharging channel defines a second passage having a substantially consistent width, and the width of the first passage is substantially equal to the width of the second passage.

17. The injection molding system of claim 1, wherein the first surface of the end surface of the discharging channel intersects with the second surface of the end surface of the discharging channel with a first angle of greater than 90 degrees, the first surface of the end surface of the inlet portion intersects with the second surface of the end surface of the inlet portion with a second angle of greater than 90 degrees, wherein the first angle is substantially equal to the second angle.

18. The injection molding system of claim 1, wherein the end portion of the inlet portion defines a recessed portion recessed from a top surface of the molding device, and a maximum with of the recessed portion is substantially equal to a maximum with of the discharging channel.

19. The injection molding system of claim 1, wherein the molding device further includes an additional inlet portion in communication with the mold cavity, and the additional inlet portion includes an end portion having an end surface; wherein the injector further includes an additional discharging channel, and the additional discharging channel includes an end portion having an end surface; wherein the end surface of the end portion of the additional discharging channel engages with the end surface of the end portion of the additional inlet portion; wherein a structure of the end portion of the additional discharging channel is different from a structure of the end portion of the discharging channel, and a structure of the end portion of the additional inlet portion is different from a structure of the end portion of the inlet portion.

20. The injection molding system of claim 4, wherein the molding device further defines a junction point in communication with in the mold cavity, wherein the junction point is configured to allow a fluid or gas to enter into or exit from the mold cavity, wherein the molding device further includes a pressure-sensing unit configured to sense the pressure in the mold cavity.

* * * * *